US005757626A

United States Patent [19]
Jovanović et al.

[11] Patent Number: 5,757,626
[45] Date of Patent: May 26, 1998

[54] SINGLE-STAGE, SINGLE-SWITCH, ISLOLATED POWER-SUPPLY TECHNIQUE WITH INPUT-CURRENT SHAPING AND FAST OUTPUT-VOLTAGE REGULATION

[75] Inventors: Milan M. Jovanović ; Laszlo Huber. both of Blacksburg, Va.

[73] Assignee: Delta Electronics Inc., Taipei, Taiwan

[21] Appl. No.: 725,904

[22] Filed: Oct. 4, 1996

Related U.S. Application Data

[63] Continuation-in-part of Ser. No. 669,001, Jun. 21, 1996, abandoned.

[51] Int. Cl.$^6$ ............................................. H02M 3/335
[52] U.S. Cl. ............................. 363/21; 363/97; 363/132
[58] Field of Search ................................. 363/20, 21, 37, 363/81, 89, 97, 125, 132

[56] References Cited

U.S. PATENT DOCUMENTS

| | | | |
|---|---|---|---|
| 4,709,181 | 11/1987 | Mercer | 363/133 |
| 5,068,776 | 11/1991 | Polivka | 363/17 |
| 5,301,095 | 4/1994 | Teramoto et al. | 363/21 |
| 5,349,514 | 9/1994 | Ushiki et al. | 363/21 |
| 5,354,972 | 10/1994 | Han | 219/715 |
| 5,424,933 | 6/1995 | Illingworth | 363/21 |
| 5,515,257 | 5/1996 | Ishii | 363/21 |
| 5,523,936 | 6/1996 | Lev et al. | 363/21 |
| 5,581,451 | 12/1996 | Ochiai | 363/21 |

OTHER PUBLICATIONS

L.H. Dixon, Jr., "High Power Factor Preregulators for Off-Line Supplies", *Unitrode Switching Regulated Power Supply Design Seminar Manual*, 1990, pp. 12–1 to 12–16.
F.-S. Tsai et al., "Off-Line Flyback Converter With Input Harmonic Current Correction", *IEEE*, 1996, pp. 120–124.
International Electrotechnical Commission, Reference No. 1000–3–2; 1995.
M. Madigan et al., "Integrated High Quality Rectifier–Regulators", *IEEE*, 1992, pp. 1043–1051.
L.D. Stevanović et al., "Input Current Shaping and Regulation of Multiple Outputs in a Single Isolated Converter", *Power Conversion Topologies*, pp. 326–333, 1993.
M. Brković et al., "Novel Single Stage AC—to —DC Converters With Magnetic Amplifiers and High Power Factor", *IEEE*, 1995, pp. 447–453.
R. Redl et al., "Design Considerations for Single–Stage Isolated Power–Factor–Corrected Power Supplies With Fast Regulation of the Output Voltage", *IEEE*, 1995, pp. 454–4458.

(List continued on next page.)

*Primary Examiner*—Adolf Berhane
*Attorney, Agent, or Firm*—Lane, Aitken & McCann

[57] ABSTRACT

A new single-stage, single-switch, input-current-shaping technique which combines the boost-like input-current shaper with a continuous-conduction-mode dc/dc output stage is described. Due to the ability to keep a relatively low voltage (<450 Vdc) on the energy-storage capacitor, this technique is suitable for the universal line-voltage applications. The voltage on the energy-storage capacitor is kept within the desirable range by the addition of two transformer windings. One winding appears in series with the boost inductor during the on time, whereas the other winding appears in series with the same inductor during the off time. By connecting the windings so that the voltages across them when they conduct the inductor current are in opposition to the input voltage, the volt-second balance of the boost-inductor core is achieved at a substantially lower voltage of the energy-storage capacitor compared to the other known approaches. In addition, for the forward-converter-type single-stage, single-switch input-current shapers, a direct transfer of a part of the input energy is achieved by the winding which appears in series with the boost inductor during the on time, while for the flyback implementation a direct transfer of a part of the input energy is achieved by the winding which appears in series with the boost inductor during the off time.

16 Claims, 16 Drawing Sheets

OTHER PUBLICATIONS

H. Watanabe et al., "The Suppressing Harmonic Currents, MS(Magnetic–Switch) Power Supply", *IEEE*, 1995, pp. 783–790.

M.M. Jovanović et al., "Reduction of Voltage Stress in Integrated High–Quality Rectifier–Regulators by Variable–Frequency Control", *IEEE*, 1994, pp. 569–575.

M.K. Nalbant, "Power Factor Calculations and Measurements", *IEEE*, 1990, pp. 543–552.

K.–H. Liu et al., "Current Waveform Distortion in Power Factor Correction Circuits Employing Discontinuous–Mode Boost Converters", *IEEE*, 1989, pp. 825–829.

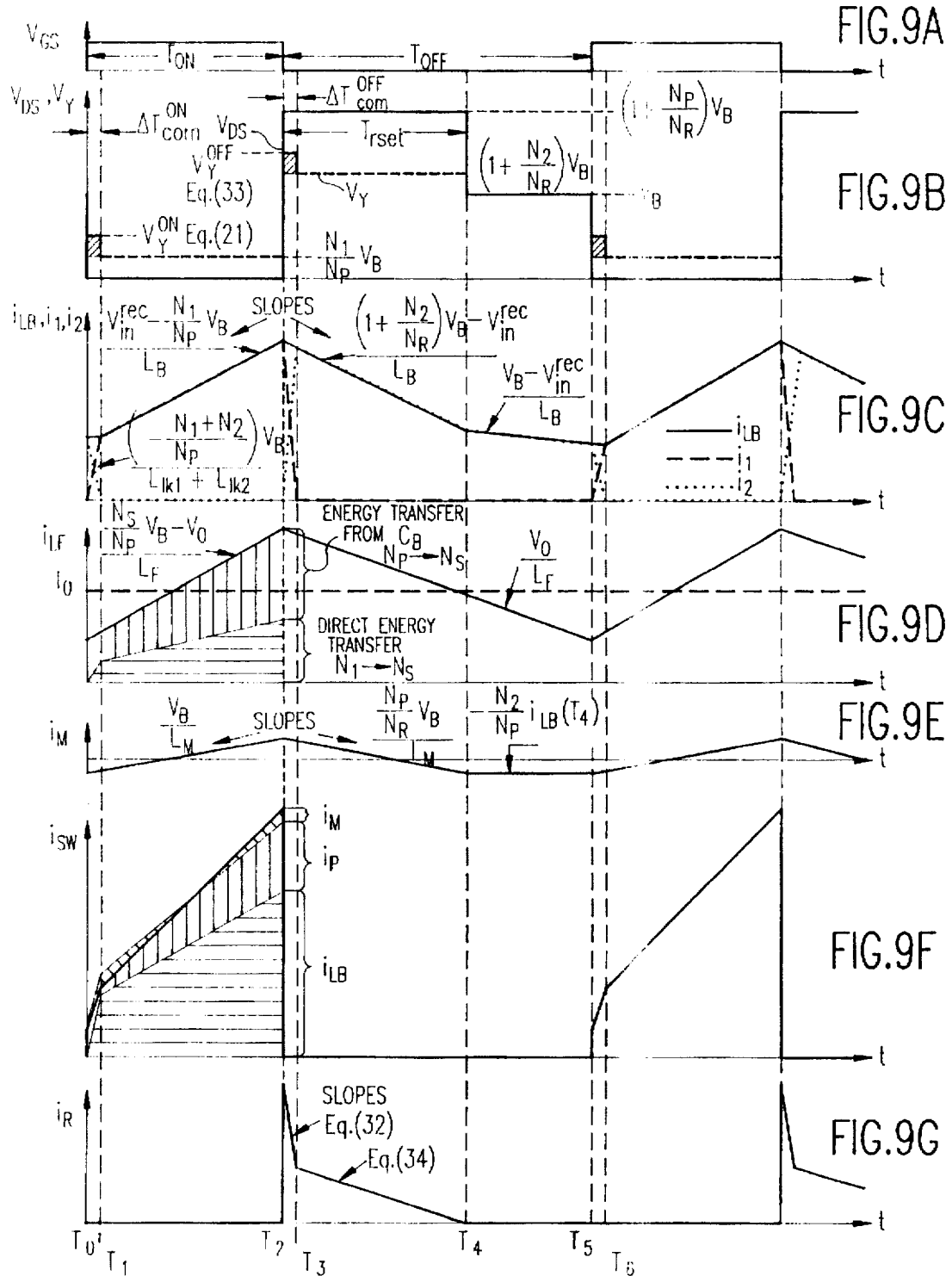

SINGLE-STAGE, SINGLE-SWITCH, ISLOLATED POWER-SUPPLY TECHNIQUE WITH INPUT-CURRENT SHAPING AND FAST OUTPUT-VOLTAGE REGULATION

CROSS REFERENCE TO RELATED APPLICATION

This is a continuation-in-part of application Ser. No. 08/669,001 filed June 21, 1996 now abandoned.

BACKGROUND OF THE INVENTION

1. Field of the Invention

This invention relates to an improved single-stage, single-switch, isolated power-supply technique with input-current shaping and fast output-voltage regulation and, more particularly, to circuit topology which reduces the maximum voltage on the energy- storage capacitor.

2. Description of the Prior Art

A number of standards regulate the harmonic content of the line current drawn from the ac mains by a piece of electronic equipment. The specific requirements of these standards depend on the type of the equipment and its power level (see, Electromagnetic Compatibility (EMC) - Part 3: Limits - Section 2: Limits for harmonic current emissions (equipment input current $\leq 16$ A per phase), IEC 1000-3-2 Document, First Edition, 1995). To comply with these standards, input-current shaping (ICS) of off-line power supplies is necessary. So far, a variety of passive and active ICS techniques have been proposed in the prior art. While passive techniques can be the best choice in many cost-sensitive applications, the active ICS techniques are used in the majority of applications due to their superior performance.

The most commonly used active approach, which meets high power-quality requirements, is a "two-stage" approach (see L. H. Dixon, Jr., "High power factor preregulators for off-line power supplies," Unitrode Switching Regulated Power Supply Design Seminar Manual, Paper I2, SEM-700, 1990). In this approach, a non-isolated boost-like converter, which is controlled so that the rectified line current follows the rectified line voltage, is used as the input stage that creates an intermediate dc bus with a relatively large second-harmonic ripple. This first ICS stage is then followed by a dc/dc converter which provides isolation and high-bandwidth voltage regulation. For high-power levels, the ICS stage is operated in the continuous-conduction mode (CCM), while the discontinuous-conduction-mode (DCM) operation is commonly used at lower power levels due to a simpler control.

Although relatively simple, mature, and viable in wide power-range applications, the two-stage approach suffers from several drawbacks. First, due to two-stage power processing, conversion efficiency is reduced. Second, a separate ICS stage adds components and complexity and, consequently, increases the cost. The cost increase is especially undesirable for low-power supplies used in consumer electronic products such as, for example, personal computers, low-end printers, home appliances, etc.

In an effort to reduce the component count and also improve the performance, a number of "single-stage" ICS techniques have been introduced recently (see M. Madigan, R. Erickson, E. Ismail, "Integrated high-quality rectifier-regulators," IEEE Power Electronics Specialists Conf. (PESC) Record, pp. 1043–1051, June 1992; L. D. Stevanovic, S. Cuk,, "Input current shaping and regulation of multiple outputs in a single isolated converter," IEEE International Telecommunication Energy Conf. (INTELEC) Proc., pp. 326–333, September 1993; M. Brkovic, S. Cuk, "Novel Single Stage AC-to-DC Converters with Magnetic Amplifiers and High Power Factor," IEEE Applied Power Electronics Conference (APEC) Proc., pp. -453, March 1995; R. Redl, L. Balogh, "Design Considerations for Single-Stage Isolated Power-Factor-Corrected Power Supplies with Fast Regulation of the Output Voltage," IEEE Applied Power Electronics Conference (APEC) Proc., pp. 454–458, March 1995; and H. Watanabe, Y. Kobayashi, Y. Sekine, M. Morikawa, T. Ishii, "The Suppressing Harmonic Currents, MS (Magnetic-Switch) Power Supply," IEEE International Telecommunication Energy Conf. (INTELEC) Proc., pp. 783–790, October 1995). In a single-stage approach, input-current shaping, isolation, and high-bandwidth control are performed in a single step, i.e., without creating an intermediate dc bus. Generally, these converters use an internal energy-storage capacitor to handle the differences between the varying instantaneous input power and a constant output power.

Among the single-step circuits, a number of prior art circuits described in Madigan, Brkovic and Watanabe and shown in FIGS. 1 through 3 seem particularly attractive because they can be implemented with only one semiconductor switch and a simple control. FIGS. 1 and 3 show the forward-converter implementations of the single-stage, single-switch ($S^4$) ICS concepts described in Madigan and Watanabe, while FIG. 2 shows the Cuk-converter implementation of the idea introduced in Brkovic. Except for the circuit in FIG. 3, all other $S^4$ICS circuits employ the DCM boost converter in the ICS stage. In fact, in these circuits, low input-current harmonic distortions are achieved through the inherent property of the DCM boost converter to draw a near sinusoidal current if its duty cycle during a line period is held relatively constant.

While boost inductor $L_1$ in the ICS stage of the converter in FIG. 1 must operate in DCM (i.e., during a part of a switching cycle the current in $L_1$ has to be zero), output inductor $L_2$ can be designed to operate either in DCM or CCM. According to the analysis in Redl, if $L_2$ operates in CCM, the voltage on energy-storage capacitor $C_B$ shows a strong dependence on the line voltage and output current. In fact, the energy-storage-capacitor voltage increases as the rms of the line voltage increases and/or output current decreases. When the load current is decreased while $L_2$ operates in CCM, the duty cycle will not change in direct response to the change of the current. Because initially the duty cycle stays constant, the input source will add more charge to energy-storage capacitor $C_B$ than the charge withdrawn from the capacitor by the load. As a result, the energy-storage capacitor voltage will increase, forcing the voltage control loop to decrease the duty cycle so that a new charge balance is established at a higher energy-storage-capacitor voltage. As explained in Redl, for a converter in FIG. 1 designed for universal line-voltage range from 90 Vac to 270 Vac, the voltage on $C_B$ can exceed 1000 Vdc at high line voltage and light load current if $L_2$ operates in CCM. As a result, the approach proposed in Madigan is not practical for applications with the universal line-voltage range. The voltage stress on the energy-storage capacitor can be substantially reduced by employing the variable switching-frequency CVSF) control as described in M. M. Jovanovic, D.M.C. Tsang, F. C. Lee, "Reduction of Voltage Stress in Integrated High-Quality Rectifiers-Regulators by Variable-Frequency Control," IEEE Applied Power Electronics Conference (APEC) Proc., pp. 569–575, March 1994. However, even with a wide-range of switching frequency, the energy-storage capacitor voltage cannot be kept below 500 Vdc. As a result, energy-storage capacitors with voltage ratings above 600 Vdc must be used. This makes the circuit in FIG. 1 and any other $S^4ICS$ circuit using the same approach impractical because high-voltage-rated storage capacitors are more expensive and bulky compared to desirable 450-V-rated capacitors which are typically used in conventional ICSs. The voltage on $C_B$ in the circuit in FIG. 1 can be kept below 450 Vdc only if output inductor $L_2$ is designed to operate in DCM. As explained in Redl, in that case the voltage on $C_B$ is independent of the load current. However, for low-voltage, high-current applications, the DCM operation of $L_2$ is not desirable because it results in much higher stresses in semiconductor components compared to the CCM operation.

The circuit in FIG. 2 can also operate with inductor $L_2$ in CCM. Because Magnetic Amplifier (MagAmp) MA1 operates as a switch, the output-voltage control and energy-storage capacitor voltage control can be done with two independent loops. Voltage across energy-storage capacitor $C_{str}$ in this circuit is kept within the desired voltage range (<450 Vdc) by a slow MagAmp regulation loop, while the semiconductor switch is used in the fast output-voltage regulation loop. In addition, another fast control loop is used to shape the input current. The major drawbacks of this approach are the complexity of control and the need for a relatively expensive square-loop magnetic material for the implementation of the MagAmp. In addition, the energy transfer in the circuit in FIG. 2 is done through capacitor $C_3$, which is a less desirable energy-transfer mechanism than the energy transfer through a rectifier.

The circuit in FIG. 3 employs the Magnetic-Switch (MS) concept to achieve ICS with CCM operation of both ICS inductor $L_1$ and output-filter inductor $L_x$. The MS is implemented with an additional winding of the transformer so that its voltage is proportional to the primary-winding voltage. The MS winding is connected in the circuit with the polarity in opposition to the energy-storage capacitor voltage when the switch is on. As a result, when the switch is on, a substantial voltage is applied to the series combination of $C_1$ and choke $L_1$ forcing the flow of the input current. When the switch is off, the $L_1$ energy is discharged to capacitor $C_{in}$ through diode $D_1$, while the transformer is reset through the resonance of its magnetizing inductance $L_m$ and capacitor $C_1$. Since the MS is not independently controllable, but it is controlled by the primary switch, this circuit suffers from a relatively high voltage on $C_{in}$ even when a VSF control is employed, as reported in Watanabe.

Finally, it should be noted that in the forward-converter $S^4ICSs$ in FIGS. 1 and 3 no energy is directly transferred from the input to the output. In fact, during the switch on time, the input energy is stored in the boost choke first, and then transferred to the energy-storage capacitor during the subsequent off time of the switch. The energy transferred to the output during the on time of the switch is the energy stored in the capacitor. The efficiency of the operation would be improved if a part of the energy is directly transferred to the output.

SUMMARY OF THE INVENTION

An object of this invention is a new $S^4ICS$ technique which combines the boost-like ICS with a CCM dc/dc output stage coupled with an ability to keep a relatively low voltage (<450 Vdc) on the energy-storage capacitor, making this technique suitable for the universal line-voltage applications.

Briefly, this invention contemplates the provision of a single-stage, single-switch, isolated power-supply technique with input-current shaping and fast output-voltage regulation in which the voltage on the energy-storage capacitor is kept within a desirable range by the addition of two transformer windings. One winding appears in series with the boost inductor during the on time, whereas the other winding appears in series with the same inductor during the off time. These two additional transformer windings are connected so that the voltages across them, when they conduct the (boost) inductor current, are in opposition to the input voltage, so that the volt-second balance of the boost-inductor core is achieved at a substantially lower voltage of the energy-storage capacitor compared to the other known prior art approaches. In addition, for the forward-converter-type $S^4ICSs$, a direct transfer of a part of the input energy is achieved by the winding which appears in series with the boost inductor during the on time. Likewise, for the flyback-type $S^4ICSs$, a direct transfer of a part of the input energy is achieved by the winding which appears in series with the boost inductor during the off time.

Although, in the next section, the invention is described for the forward-converter implementation, this technique can be applied to any other single-ended, single-switch, isolated, single- or multiple-output topology such as the flyback, Cuk, sepic, zeta, and other converters. Furthermore, the concept described in this invention can be extended to "hard-switched" and "soft-switched" multi-switch converters such as two-switch forward and flyback converters, as well as the bridge-type topologies.

The foregoing and other objects, aspects and advantages will be better understood from the following detailed description of a preferred embodiment of the invention with reference to the drawings, in which:

BRIEF DESCRIPTION OF THE DRAWINGS

FIG. 9a-g shows the key waveforms of the S-ICS forward converter with $L_B$ operating in CCM.

DETAILED DESCRIPTION OF THE PREFERRED EMBODIMENTS

Figure 1:
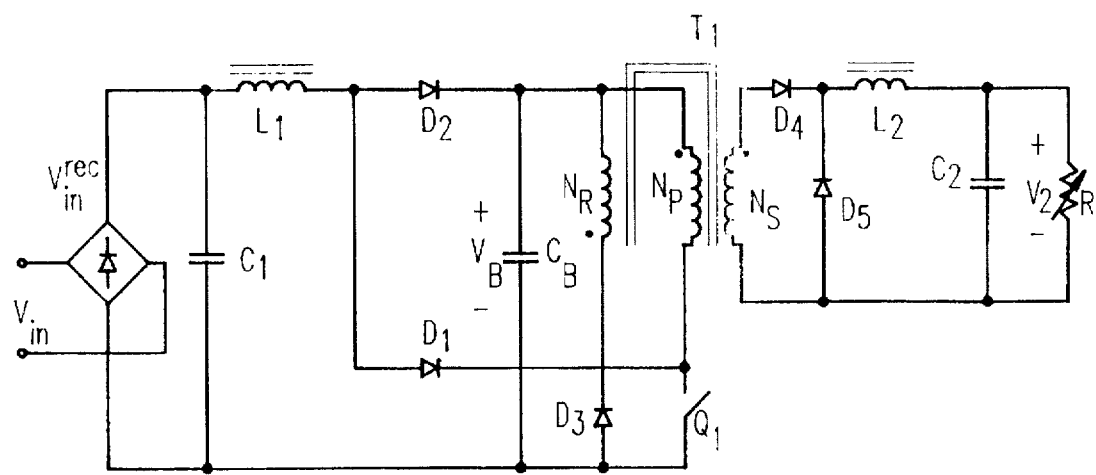
FIG. 1 is a schematic drawing of a prior art forward-converter implementation of the $S^4ICS$.
Figure 2:
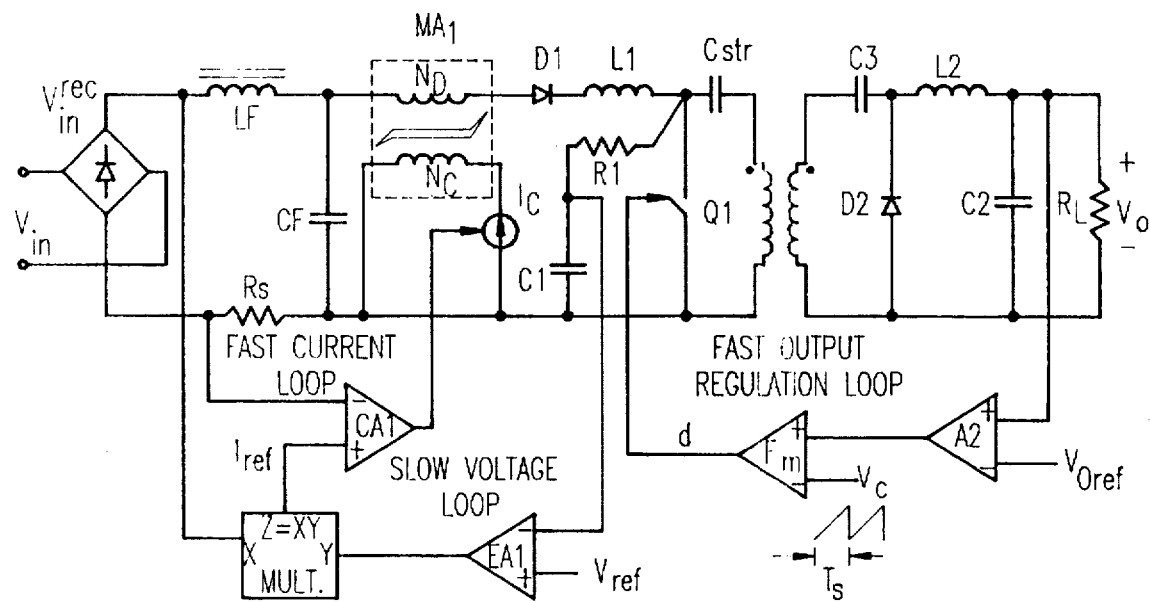
FIG. 2 is a schematic drawing of a prior art Cuk-converter implementation of the $S^4ICS$.
Figure 3:
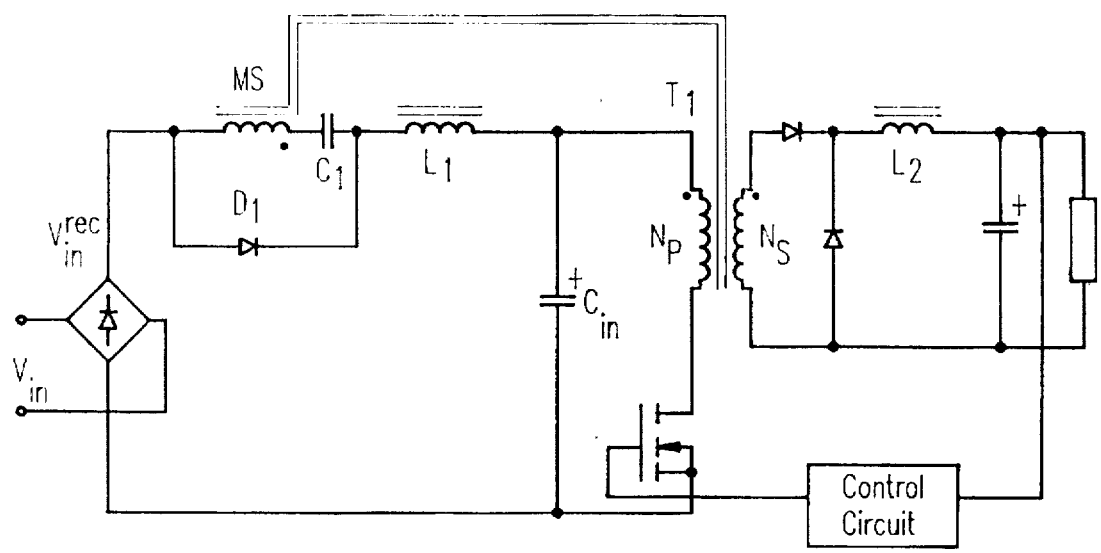
FIG. 3 is a schematic drawing of a prior art forward-converter implementation of the $S^4ICS$.
Figure 4:
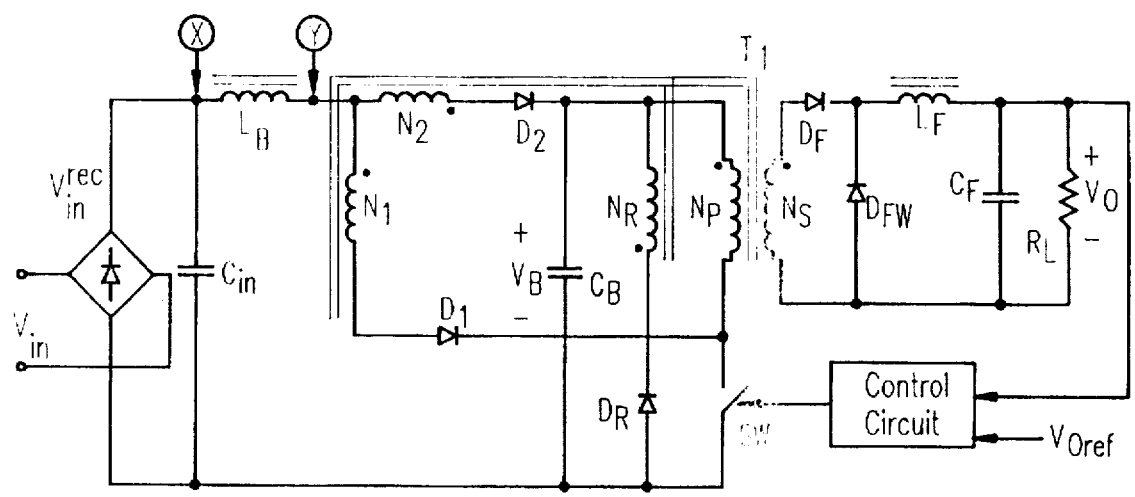
FIG. 4 is a schematic drawing of a specific embodiment of an $S^4ICS$ forward converter proposed in this invention.

FIG. 4 shows a circuit diagram of an $S^4ICS$ in accordance with this invention which combines a boost-converter input stage with a CCM forward-converter output stage. In FIG. 4, the core of transformer $T_1$ is reset by reset winding $N_R$. Transformer windings $N_1$ and $N_2$ are used to reduce the voltage of energy-storage capacitor $C_B$. In addition, winding $N_1$ is utilized for the direct energy transfer from the input to the output. Inductances $L_{lk1}$ and $L_{lk2}$ represent the leakage inductances of windings $N_1$ and $N_2$, respectively. A small input capacitor $C_{in}$ is used to filter out the switching-frequency ripple of the ICS-inductor current. Consequently, the rectified line current is the average of the current flowing from ICS inductor $L_B$.

One side (node X) of boost inductor $L_B$ is coupled to full-wave rectified input $v_{in}^{rec}$. Winding $N_2$ of isolation transformer $T_1$ is coupled, via diode $D_2$, between the other side (node Y) of boost inductor $L_B$ and one side of primary winding $N_P$ of isolation transformer $T_1$. Winding $N_1$ of isolation transformer $T_1$ is coupled, via diode $D_1$, between node Y and the other side of primary winding $N_P$. The control circuit, as in prior art $S^4ICS$ circuits, controls the opening and closing of a semiconductor switch SW in order to maintain a desired output voltage $V_o$ across load $R_L$. Output inductor $L_F$ and diode $D_F$ couple secondary winding $N_S$ of transformer $T_1$ to load $R_L$. Filter capacitor $C_F$ is connected across load $R_L$. Free wheeling diode $D_{FW}$ provides a conduction path for output inductor $L_F$ when the switch SW is off.

In operation, when switch SW is closed, the polarity of winding $N_1$ is such that the induced voltage across $N_1$ is in opposition to rectified input voltage $v_{in}^{rec}$. This reduces the volt-second product across boost inductor $L_B$ during on time (i.e. switch closed) of switch SW, and hence reduces the energy stored in boost inductor $L_B$ compared to a corresponding circuit without winding $N_1$. This in turn reduces the voltage of energy storage capacitor $C_B$ needed to reset the core of boost inductor $L_B$ during the switch off time. In addition, it should be noted that during the switch on time, winding $N_1$ couples input power to the load. Transformer winding $N_2$ is in series between the boost inductor $L_B$ and the energy storage capacitor when switch SW is open. The polarity of $N_2$ is such, that during the switch open time, $N_2$'s induced voltage opposes rectified input voltage $v_{in}^{rec}$ and aids the reset of $L_B$, thus further reducing voltage $V_B$ across the energy storage capacitor necessary to reset boost inductor $L_B$.

To simplify the analysis, it is assumed that all semiconductor components are ideal. According to this assumption, the primary switch and the rectifiers do not have parasitic capacitances and represent ideal short and open circuits in their on and off states, respectively. Finally, in the following analysis, the input voltage of the converter is considered constant during a switching cycle because the switching frequency is much higher than the line frequency.

To further simplify the explanation of the circuit operation, it is assumed that the inductance of ICS inductor $L_B$ in FIG. 4 is small so that inductor $L_B$ operates in DCM, and that the inductance of output-filter inductor $L_F$ is large enough so, that inductor $L_F$ operates in CCM. Since in the DCM operation, the leakage inductances of the auxiliary windings $N_1$ and $N_2$ have no effect on the circuits operation, they are neglected in the following analysis by assuming that $L_{lk1}=L_{lk2}=$ ). To facilitate the analysis of operation, FIGS. 5 and 6 stages of the converter during a switching cycle and its key waveforms, respectively.

Figure 5A:
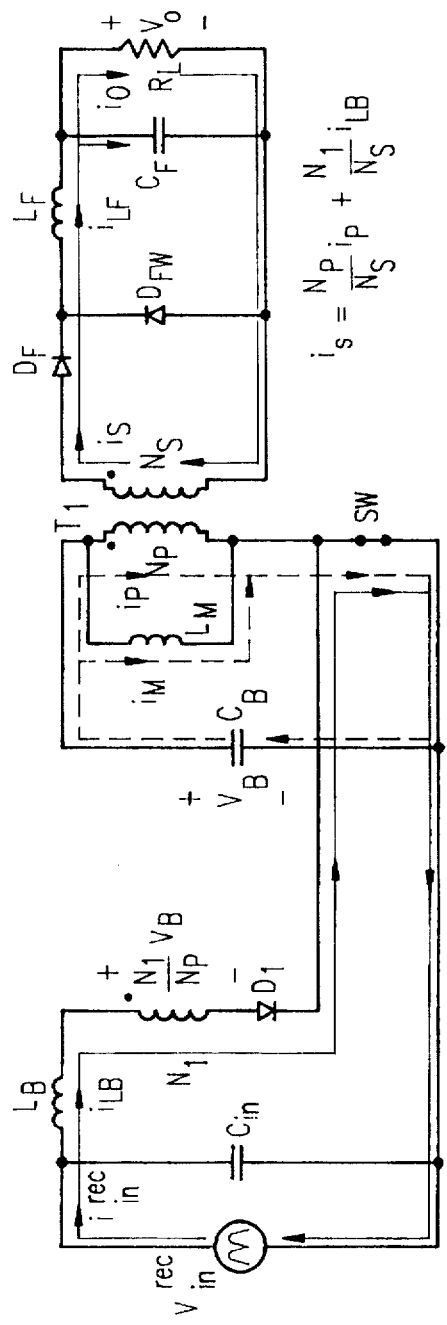
FIG. 5a-c shows the topological stages of the $S^4ICS$ forward converter with$L_B$ operating in DCM shown in FIG. 4.

Due to the DCM operation of $L_B$ and the CCM operation of $L_F$, at the moment immediately before primary switch SW is turned on, current $i_{LB}$ is zero, while current $i_{LF}$ is freewheeling through freewheeling diode $D_{FW}$, inductor $L_F$, and the output. When switch SW is closed at $t=T_0$, current $i_{LB}$ starts flowing through transformer winding $N_1$, rectifier $D_1$, and switch SW, as shown in FIG. 5(a). The slope of this current is determined by $$\frac{di_{LB}}{dt} = \frac{v_{in}^{rec} - (N_1/N_P)V_B}{L_B} \quad (1)$$

where $v_{in}^{rec}$ is the instantaneous rectified line voltage for the switching cycle commencing at $t=T_0$, $N_1$ is the number of turns of auxiliary winding $N_1$, $N_P$ is the number of turns of the primary winding, and $V_B$ is the energy-storage (bulk) capacitor voltage.

Also, at $t=T_0$, output-filter inductor current $i_{LF}$ is commutated from freewheeling diode $D_{FW}$ to forward diode $D_F$ because of the induced positive secondary voltage. The rate of the increase of current $i_{LF}=i_S$ is given by $$\frac{di_{LF}}{dt} = \frac{(N_S/N_P)V_B - V_O}{L_F}, \quad (2)$$

where $N_S$ is the number of secondary turns.

Finally, during the on time of the switch, transformer magnetizing current $i_M$ increases according to $$\frac{di_M}{dt} = \frac{V_B}{L_M}, \quad (3)$$

where $L_M$ is the magnetizing inductance.

From FIG. 5(a), during the on time, switch current $i_{SW}$ is given by the sum of ICS-inductor current $i_{LB}$, primary-winding current $i_P$, and magnetizing current $i_M$, i.e., $$i_{SW}=i_{LB}+i_P+i_M. \quad (4)$$

Figure 6:
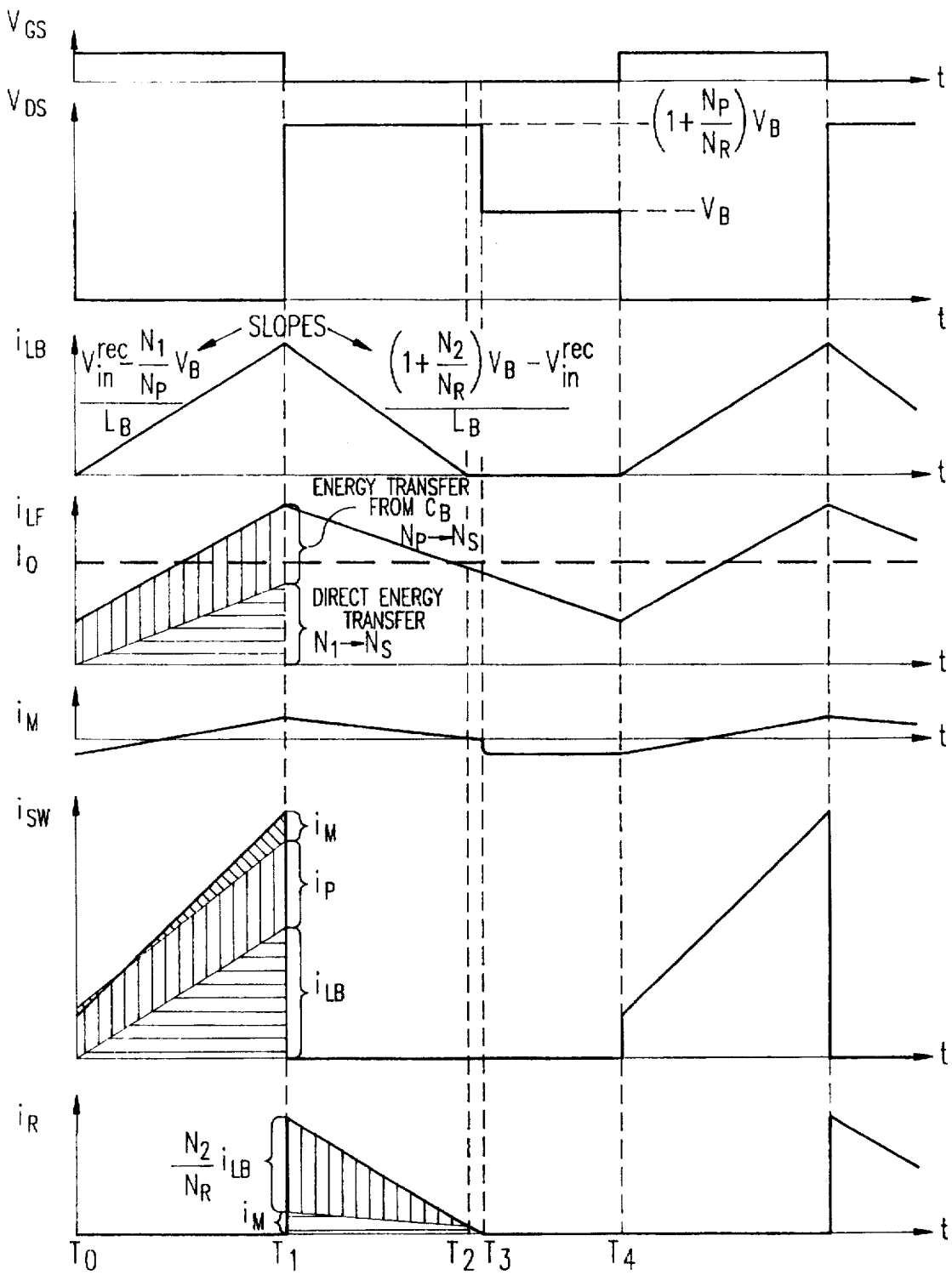
FIG. 6 shows the key waveforms of the $S^4ICS$ forward converter with$L_B$ operating in DCM shown in FIG. 4.

To help visualize the components of switch current $i_{SW}$, FIG. 6 uses different hatching patterns for each component.

Also, from FIG. 5(a) and Ampere's law, the currents flowing in the transformer are related as $$N_P i_P + N_1 i_{LB} - N_S i_S = i_M \quad (5)$$

By neglecting magnetizing current $i_M$ in Eq. 5 because it is much smaller compared to the other currents, secondary current $i_s$ during on time can be expressed as $$i_S = \frac{N_P}{N_S} i_P + \frac{N_1}{N_S} i_{LB}. \quad (6)$$

From Eq. 6, it can be seen that the secondary current, which during on time supplies output energy, is composed of two components which obtain energy from different sources. The energy transferred to the secondary which is associated with primary current $i_P$ is obtained from the discharging energy-storage capacitor $C_B$, while the energy associated with ICS inductor current $i_{LB}$ is drawn directly from the input line. The hatched areas in the $i_{LF}$ waveform in FIG. 6 indicate the two current components.

Figure 5B:
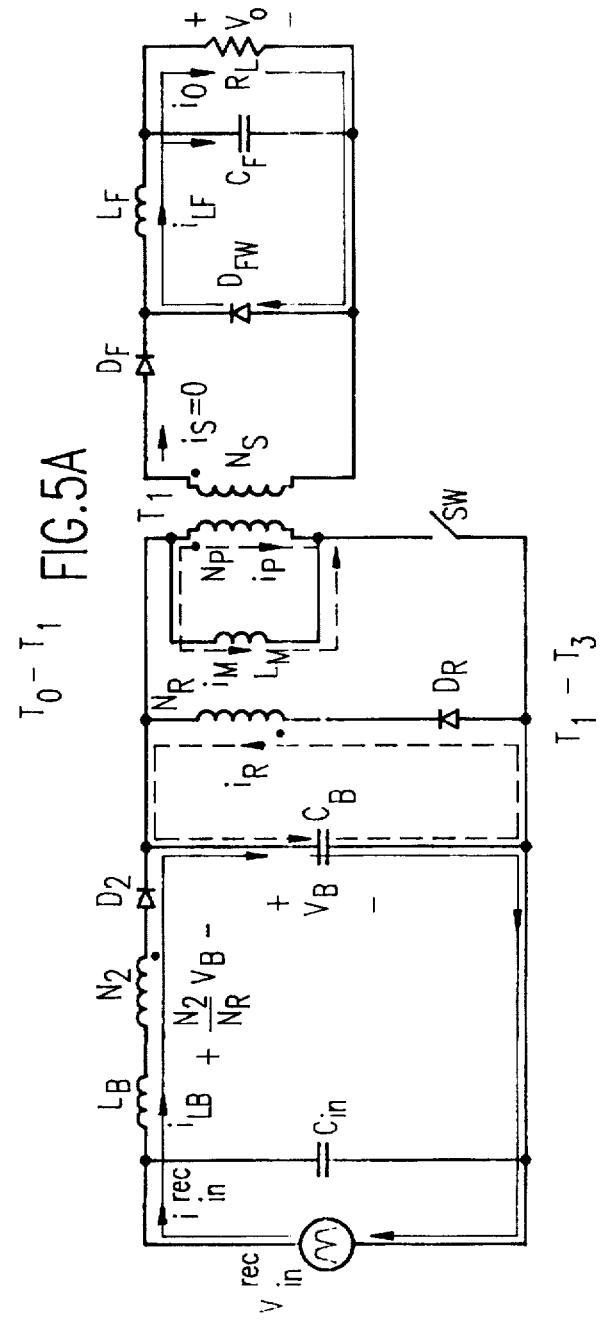

When primary switch SW is turned off at $t=T_1$, primary current $i_P$ and, consequently, secondary current $i_s$ cease to flow. As a result, $i_{LF}$ is commutated into freewheeling rectifier $D_{FW}$, as shown in FIG. 5(b). Due to the negative voltage $V_o$ applied across $L_F$, $i_{LF}$ decreases during this interval. Also, at $t=T_1$, current $i_{LB}$, which was flowing through switch SW, is diverted to energy-storage capacitor $C_B$, as indicated in FIG. 5(b). The downslope of $i_{LB}$ is given by $$\frac{di_{LB}}{dt} = \frac{v_{in}^{rec} - (1 + N_2/N_R)V_B}{L_B}. \tag{7}$$

Since during off time, $i_{LB}$ needs to decrease to zero to completely reset the $L_B$ core, the voltage applied across $L_B$ must be negative, i.e., $$(1+N_2/N_R)V_B > v_{in}^{rec} \tag{8}$$

From Eq. 7, it can be seen that with winding $N_2$ the required reset voltage for $L_B$ can be obtained with a smaller $V_B$ because of induced voltage $(N_2/N_R)V_B$ across winding $N_2$.

The reset of the transformer core is done by reset winding $N_R$. Namely, after switch SW is turned off, the magnetizing current is transferred to this winding. In addition, the reset winding also carries reflected input current $i_{LB}$ because of the magnetic coupling between windings $N_2$ and $N_R$. According to Ampere's law, reset winding current is given by $$i_R = \frac{N_P}{N_R} i_M + \frac{N_2}{N_R} i_{LB}. \tag{9}$$

As it can be seen from FIG. 5(b), during the off time, energy stored in $L_B$ is discharged to $C_B$ through two paths. One path is the direct path through rectifier $D_2$, whereas the other path is the indirect path through the reset winding. The ratio of the directly and indirectly discharged energy is determined by turns ratio $N_2/N_R$. In FIG. 6, the energy stored in $L_B$ completely discharges at $t=T_2$.

Finally, during the reset of the transformer, the voltage stress on switch SW is $$V_{SW} = \left(1 + \frac{N_P}{N_R}\right) V_B. \tag{10}$$

Figure 5C:
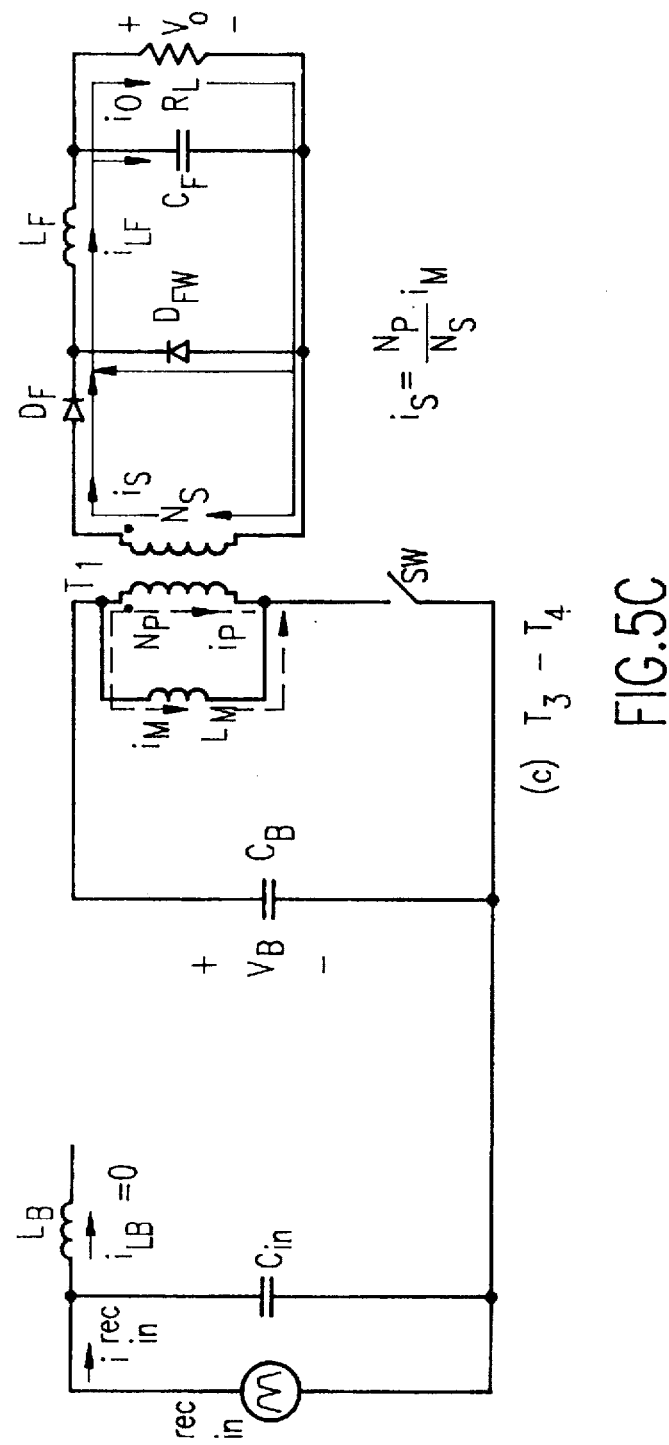

When the flux in the core of the transformer is completely reset at $t=T_3$, the voltage across the transformer collapses to zero and reflected magnetizing current $(N_P/N_s)i_M$ starts flowing through the secondary, as indicated in FIG. 5(c). The topological stage in FIG. 5(c) lasts until the initiation of the next switching cycle.

It should be noted that in FIG. 6 the energy stored in $L_B$ is discharged ($i_{LB}$ falls to zero at $t=T_2$) before the reset of the transformer is completed at $t=T_3$. However, the operation of the circuit remains unchanged if the transformer reset is completed before $L_B$ is completely discharged.

To ensure a proper operation of the circuit, the number of turns of windings $N_1$ and $N_2$ must be selected so that rectifier $D_2$ is off during the time switch SW is closed. From FIG. 4, this condition requires that $$\frac{N_1}{N_P} V_B + \frac{N_2}{N_P} V_B < V_B, \tag{11}$$

or $$\frac{N_1}{N_P} + \frac{N_2}{N_P} < 1. \tag{12}$$

Figure 7:
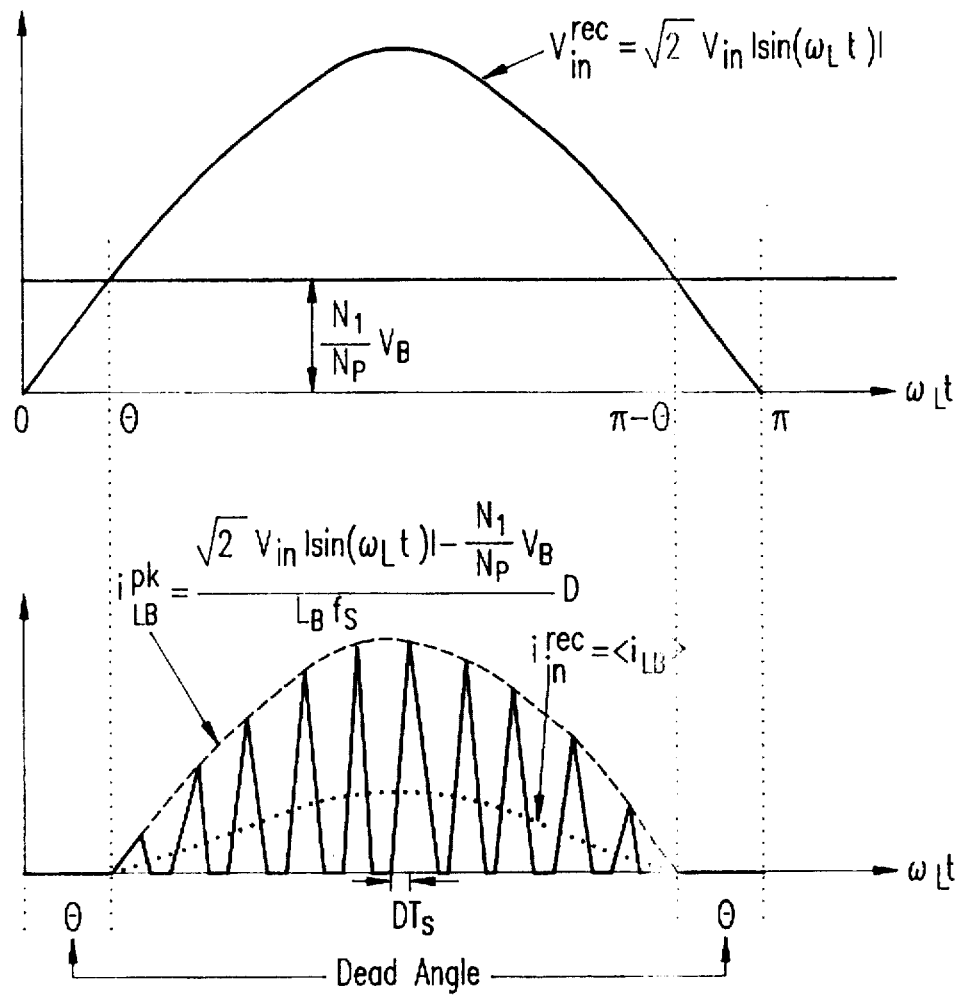
FIG. 7 shows the line voltage and current waveforms of the $S^4ICS$ forward converter with $L_B$ operating in DCM shown in FIG. 4.

To maximize the direct energy transfer, it is desirable to select ratio $N_1/N_P$ large as possible. However, a larger ratio causes larger input-current harmonic distortions, as illustrated in FIG. 7. Namely, $i_{LB}$ current, and therefore, the input current, can not flow until the line voltage, exceeds the $N_1$-winding voltage $(N_1/N_P)V_B$. Therefore, by increasing $N_1/N_P$, the zero-crossing distortions are Increased due to a larger dead angle, i.e., a longer period with $i_{LB}=0$. The dead angle, $\theta$, can be calculated from $$\theta = \arcsin \frac{N_1}{N_P} \frac{V_B}{\sqrt{2} V_{in}}, \tag{13}$$

where $V_{in}$ is the rms input voltage. The relationships between $\theta$ and total harmonic distortions (THD) is discussed in M. K. Nablant, "Power Factor Calculations and Measurements," IEEE Applied Power Electronics Conference (APEC) Proc., pp. 543–552, March 1990. In addition to these crossover harmonic distortions, the input current contains the harmonic distortions caused by the finite downslope of $i_{LB}$, as explained and quantified in K. H. Liu, Y. L. Lin, "Current Waveform Distortion in Power Factor Correction Circuits Employing Discontinuous-Mode Boost Converters," IEEE Power Electronics Specialists Conf. (PESC) Record, pp. 825–829, June 1989. Generally, these distortions decrease as the $i_{LB}$ downslope increases. As a rule of thumb, to meet current harmonic-limit specifications (defined in the IEC 1000-3-2 document) dead angle $\theta$ should not exceed 45°.

During the time interval where the instantaneous line voltage exceeds the induced voltage on winding $N_1$, the peak of current $i_{LB}$ is given by $$i_{LB}^{pk} = \frac{\sqrt{2} V_{in}|\sin(\omega_L t)| - \frac{N_1}{N_P} V_B}{L_B f_s} D, \tag{14}$$

where $\omega_L$ is the line frequency (50 or 60 Hz), $f_s$ is the switching frequency, and D is the duty cycle. The average of $i_{LB}$ represents the rectified input current, as illustrated in FIG. 7.

The duty cycle of the switch is determined by the fast (wide-bandwidth) output-voltage control loop. If the voltage ripple on $C_B$ is small, the duty cycle is essentially constant during a half of a line cycle. Due to the CCM operation of the output-filter inductor, duty cycle D is given by $$D = \frac{N_P}{N_S} \frac{V_O}{V_B}. \tag{15}$$

To use the above equations, energy-storage-capacitor voltage $V_B$ needs to be known. By applying the input-output power balance principle to the circuit in FIG. 4, this voltage can be expressed in an implicit form as $$\frac{\eta}{\pi} \left[\frac{\frac{N_P}{N_S} \sqrt{2} V_{in} V_O}{V_B}\right]^2 \frac{1 + \frac{N_2}{N_R} - \frac{N_1}{N_P}}{V_O/o} \frac{1}{L_B f_s} \int_\theta^{\pi/2} \frac{\sin^2(x) - \frac{N_1}{N_P} \frac{V_P}{\sqrt{2} V_{in}} \sin(x)}{1 + \frac{N_2}{N_R} - \frac{\sqrt{2} V_{in}}{V_B} \sin(x)} dx = 1 \tag{16}$$

where Θ is the assumed efficiency of the converter and $I_o$ is the output (load) current.

As it can be concluded by inspecting Eq. 16, $V_B$ increases as the line voltage increases and/or the output current decreases. Therefore, $V_B$ is the highest at high line and light load. Depending on the minimum load specifications, $V_B$ may exceed the desired voltage level (<450 Vdc) even with the maximum possible induced voltage on winding $N_2$ which according to Eq. 16 reduces $V_B$. In that case, the desired $V_B$ can be achieved either by VSF control or by operating $L_F$ in DCM at light loads. Namely, from Eq. 16, it can be seen that $V_B$ is inversely proportional to $\sqrt{s}$. Therefore, by increasing the switching frequency as the load decreases and/or line voltage increases, the energy-storage-capacitor voltage can be limited to the desired level. One implementation of the VSF control is described in Jovanovic. At light loads, voltage $V_B$ can also be li $L_F$. As described in Redl, when both $L_B$ and $L_F$ operate in DCM, $V_B$ is independent of the output current but only depends on the $L_B/L_F$ ratio.

In the preceding explanation, it was arbitrarily assumed, for the sake of description simplifications, that the inductance of boost inductor $L_B$ is small so that $L_B$ always operates in DCM. However, the proposed ICS circuit shown in FIG. 4 can also properly operate for larger values of boost inductance $L_B$ which result in the CCM operation of $L_B$. To facilitate the explanation of the circuit operation with $L_B$ operating in CCM, FIGS. 8 and 9 show the topological stages and the key waveforms, respectively. It should be noted that while the leakage inductances of the transformer have no significant effect on the operation of the circuit with $L_B$ operating in DCM and, consequently, were neglected in the preceding explanation, the leakage inductances of auxiliary windings $N_1$ and $N_2$ play a major role in the operation of the circuit with $L_B$ operating in CCM and cannot be neglected. As a result, in FIG. 8 the leakage inductances of windings $N_1$ and $N_2$ are shown as leakage inductance $L_{1k1}$ in series with winding $N_1$ and leakage inductance $L_{1k2}$ in series with winding N2.

Figure 8A:
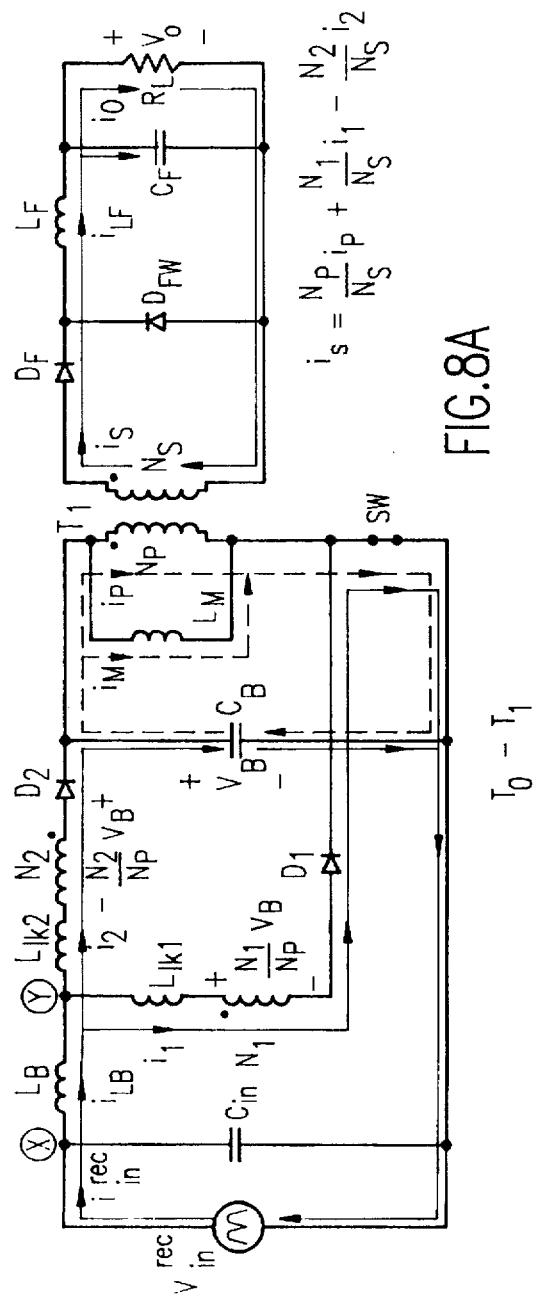
FIG. 8a-e shows the topological stages of the $S^4ICS$ forward converter with $L_B$ operating in CCM.

Due to the CCM operation of $L_B$, at the moment immediately before primary switch SW is turned on (closed), the entire boost-inductor current $i_{LB}$ is flowing through winding $N_2$ and rectifier $D_2$ into bulk capacitor $C_B$. At the same time, transformer secondary winding $N_S$ is shorted because a part of the transformer magnetizing current flows through winding $N_S$ and rectifier $D_F$, while current $i_{LF}$ is freewheeling through rectifier $D_{FW}$, inductor $L_F$, and the output, as shown in FIG. 8(e). After switch SW is closed at t=$T_0$, current $i_{LB}$ starts commutating from winding $N_2$ to winding $N_1$, while current $i_{LF}$ commutates from rectifier $D_{FW}$ to rectifier $D_F$. According to FIG. 8(a) which represents the circuit in FIG. 4 during the commutation interval [T)-$T_1$], the $i_{LB}$ commutation is governed by $$V_B - \frac{N_2}{N_P} V_B + L_{lk2}\frac{di_2}{dt} - L_{lk1}\frac{di_1}{dt} - \frac{N_1}{N_P} V_B = 0. \quad (17)$$

Since during the commutation interval [$T_0$-$T_1$], boost-inductor current $i_{LB}$ does not change significantly due to a relative large inductance of boost inductor $L_B$ required for the CCM operation, it can be assumed that $$i_{LB} = i_1 + i_2 \cong const., \quad (18)$$

i.e., $$\frac{di_1}{dt} = -\frac{di_2}{dt}. \quad (19)$$

From Eqs. 17 and 19, the slopes of current $i_1$ and $i_2$ during the commutation interval [$T_0$-$T_1$] are approximately given by $$\frac{di_1}{dt} = -\frac{di_2}{dt} = \frac{\left(1 - \frac{N_1 + N_2}{N_P}\right) V_B}{L_{lk1} + L_{lk2}} \quad (20)$$

The commutation of $i_{LF}$ from $D_{FW}$ to $D_F$ can be analyzed in a similar fashion. However, this commutation is well understood and it is not important for the description of ICS properties of the analyzed circuit. Therfore, in this analysis, by neglecting the leakage inductance between primary winding $N_P$ and secondary winding $N_S$ of the transformer, it is assumed that this commutation is instantaneous.

Also, it should be noted that during the commutation interval [$T_0$-$T_1$], the voltage of the common node of the boost inductor, winding $N_1$, and winding $N_2$ (node Y in FIG. 8 (a)), is given by $$V_Y^{ON} = \frac{L_{lk1}(1 - N_2/N_P) + N_1/N_P L_{lk2}}{L_{lk1} + L_{lk2}} V_B, \quad (21)$$

as indicated in FIG. 9(b). The above equation was derived from Eqs. 17 and 20.

Figure 8B:
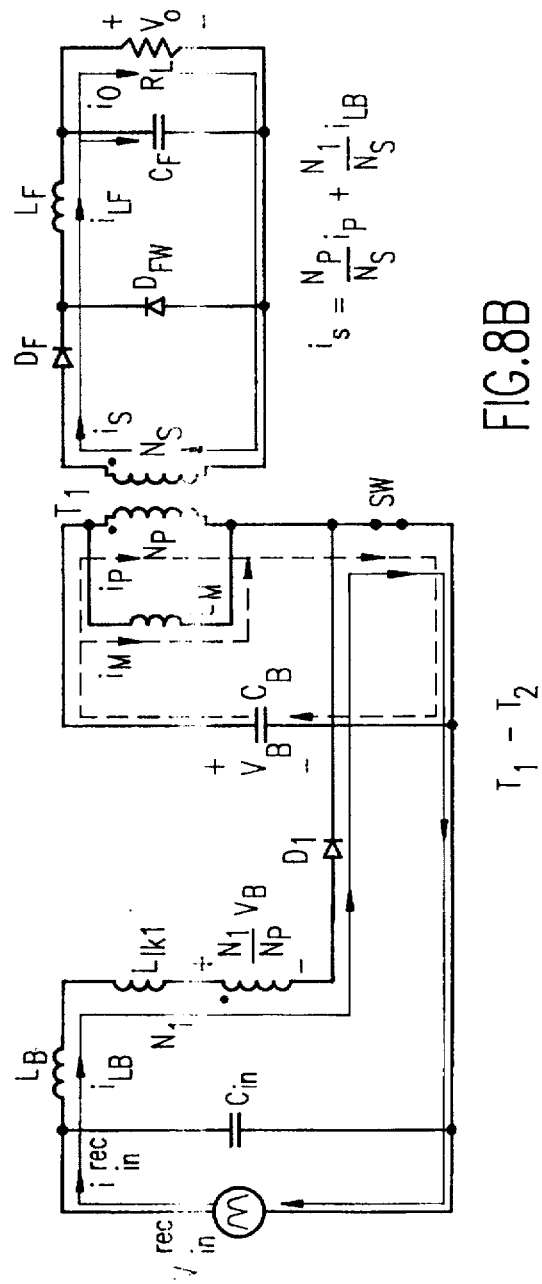

After the commutation of $i_{LB}$ is completed at t=$T_1$, the entire $i_{LB}$ flows through winding $N_1$ as shown in FIG. 8(b). During the [$T_1$-$T_2$] interval, the boost-inductor current $i_{LB}$ is given by $$\frac{di_{LB}}{dt} = \frac{di_1}{dt} = \frac{v_{in}^{rec} - \frac{N_1}{N_P} V_B}{L_B + L_{lk1}} \approx \frac{v_{in}^{rec} - \frac{N_1}{N_P} V_B}{L_B}, \quad (22)$$

where the approximation assumes $L_B \gg L_{1k1}$.

From Eq.22, it can be seen that if the instantaneous rectified-line voltage $v_{in}^{rec}$ is smaller than the dc voltage across winding $N_1$, i.e., if $$v_{in}^{rec} < \frac{N_1}{N_P} V_B \quad (23)$$

no $i_{LB}$ can build up in inductor $L_B$. As a result, the line current (average of $i_{LB}$) contains zero-crossing distortions caused by dead angle Θ (which can be calculated by Eq. 13) of current $i_{LB}$.

On the other hand, for $$v_{in}^{rec} > \frac{N_1}{N_P} V_B \quad (24)$$

Figure 10:
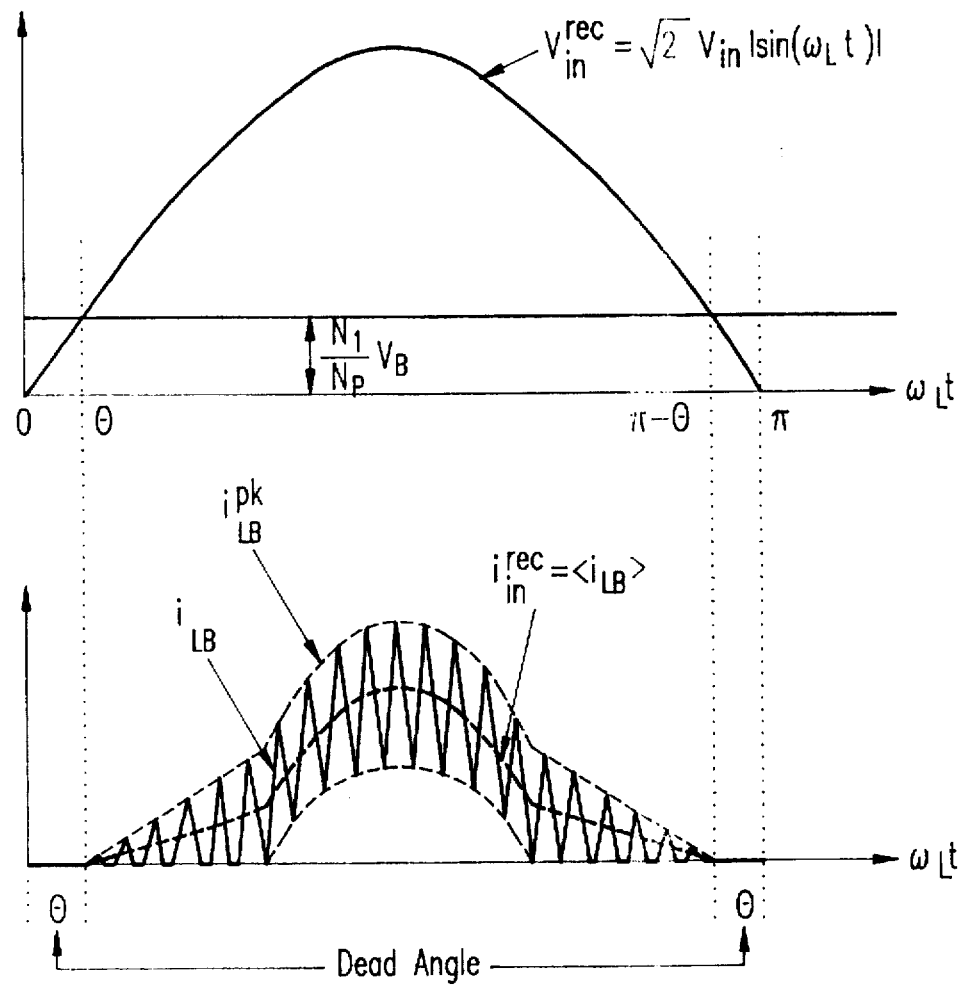
FIG. 10 shows the line voltage and current waveforms of the $S^4ICS$ forward converter with $L_B$ operating in CCM.

$i_{LB}$ can flow after the commutation period [$T_0$-$T_1$] is completed, as shown in FIG. 9(c). However, during the time intervals for which $v_{in}^{rec}$ is only slightly higher than winding $N_1$ voltage, ($N_1/N_P$)$V_B$, $i_{LB}$ is discontinuous. Therefore, during one half of a line period, the boost inductor operates in both DCM and CCM as illustrated in FIG. 10. The DCM region is more pronounced, i.e., lasts for a larger portion of a line half period, for designs with larger $N_1/N_P$ ratios.

Due to the assumed instantaneous commutation of $i_{LF}$ from $D_{FW}$ to $D_F$ at t=$T_0$, $i_{LF}$ and magnetizing current $i_M$ linearly increase during the time period from t=$T_0$ to t=$T_2$, as illustrated in FIGS. 9 (d) and (e). From FIG. 8 (b), the rate of $i_{LF}$ increase is given by $$\frac{di_{LF}}{dt} = \frac{\frac{N_S}{N_P} V_B - V_O}{L_F}, \quad (25)$$

while the up-slope of $i_M$ is given by $$\frac{di_M}{dt} = \frac{V_B}{L_M}. \quad (26)$$

From FIGS. 8(a) and (b), the total switch current $i_{SW}$ during the on time is given by the sum of boost-inductor current $i_{LB}$, primary-winding current $i_P$, and magnetizing current $i_M$. To help visualize the components of $i_{SW}$, FIG. 9(f) uses different hatching patterns for each component.

Also, from FIGS. 8(a) and (b) and Ampere's law, it follows that secondary-winding current $i_S$ is given by $$i_S = \frac{N_P}{N_S} i_P + \frac{N_1}{N_S} i_1 - \frac{N_2}{N_S} i_2, \quad (27)$$

during the commutation period $[T_0-T_1]$, and $$i_S = \frac{N_P}{N_S} i_P + \frac{N_1}{N_S} i_{LB}, \quad (28)$$

during the $[T_1-T_2]$ period.

As it can be seen from Eq.28, during the $[T_1-T_2]$ time interval, the output energy is supplied from bulk capacitor $C_B$ by current $i_P$, and directly from the source by current $i_{LB}$.

After switch SW is turned off at $t=T_2$, FIG. 9, boost-inductor current $i_{LB}$ begins commutating from winding $N_1$ to winding $N_2$, while output-filter-inductor current $i_{LF}$ instantaneously commutates from rectifier $D_F$ to rectifier $D_{FW}$ because the leakage inductance between windings $N_P$ and $N_S$ is assumed zero. At the same time, the transformer core starts the reset phase by transferring magnetizing inductance $i_M$ to the reset winding $N_R$, thus, discharging the energy stored in the core into bulk capacitor $C_B$.

Figure 8C:
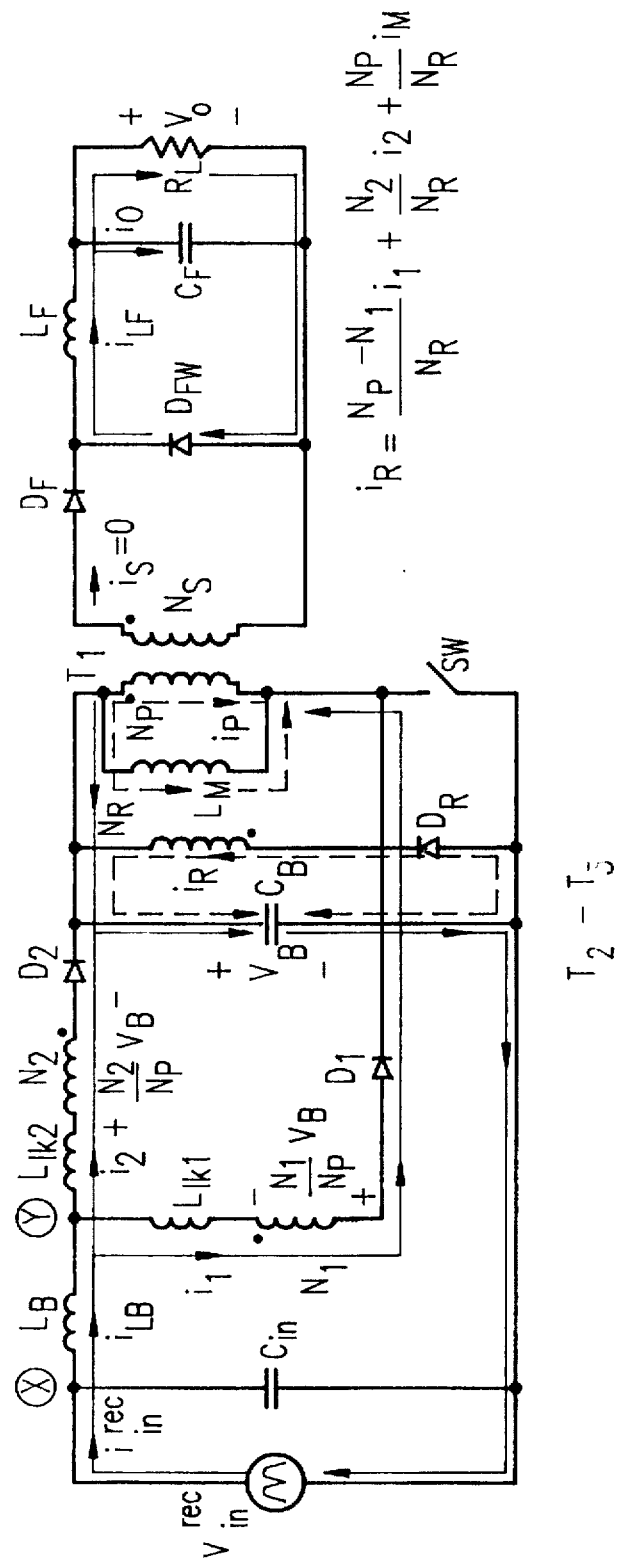

From FIG. 8(c), using the assumption stated in Eq. 18, the slopes of currents $i_1$ and $i_2$ during the commutation period $[T_2-T_3]$ can be calculated as $$\frac{di_1}{dt} = -\frac{di_2}{dt} = -\frac{\left(1 - \frac{N_1 + N_2}{N_R}\right) V_B}{L_{lk1} + L_{lk2}}. \quad (29)$$

Also, from FIG. 8(c), the downslope of magnetizing current $i_M$ is $$\frac{di_M}{dt} = -\frac{\frac{N_P}{N_R} V_B}{L_M}, \quad (30)$$

while, from FIG. 8(c) and Ampere's law, reset-winding current $i_R$ during the $[T_2-T_3]$ interval is given by $$i_R = \frac{N_P - N_1}{N_R} i_1 + \frac{N_2}{N_R} i_2 + \frac{N_P}{N_R} i_M. \quad (31)$$

Using Eqs. 29–31, the downslope of $i_R$ during the commutation interval $[T_2-T_3]$ is $$\frac{di_R}{dt} = \quad (32)$$

$$-\left[\frac{(N_P - N_1 - N_2)(N_R - N_1 - N_2)}{N_R^2 (L_{lk1} + L_{lk2})} V_B + \left(\frac{N_P}{N_R}\right)^2 \frac{V_B}{L_M}\right]$$

Since according to Eq. 12, for proper operation of the circuit $N_P > N_1 + N_2$, and for a typical design $N_R \approx N_P$, the $di_R/dt$ rate is indeed negative, as shown in FIG. 9(g).

The voltage of note Y during the commutation interval $[T_2-T_3]$, $V_Y^{OFF}$, can be calculated from the circuit in FIG. 8(c), with the help of Eq. 29, as $$V_Y^{OFF} = \frac{\left(1 + \frac{N_2}{N_R}\right) L_{lk1} + \left(2 - \frac{N_1}{N_R}\right) L_{lk2}}{L_{lk1} + L_{lk2}} V_B. \quad (33)$$

Figure 8D:
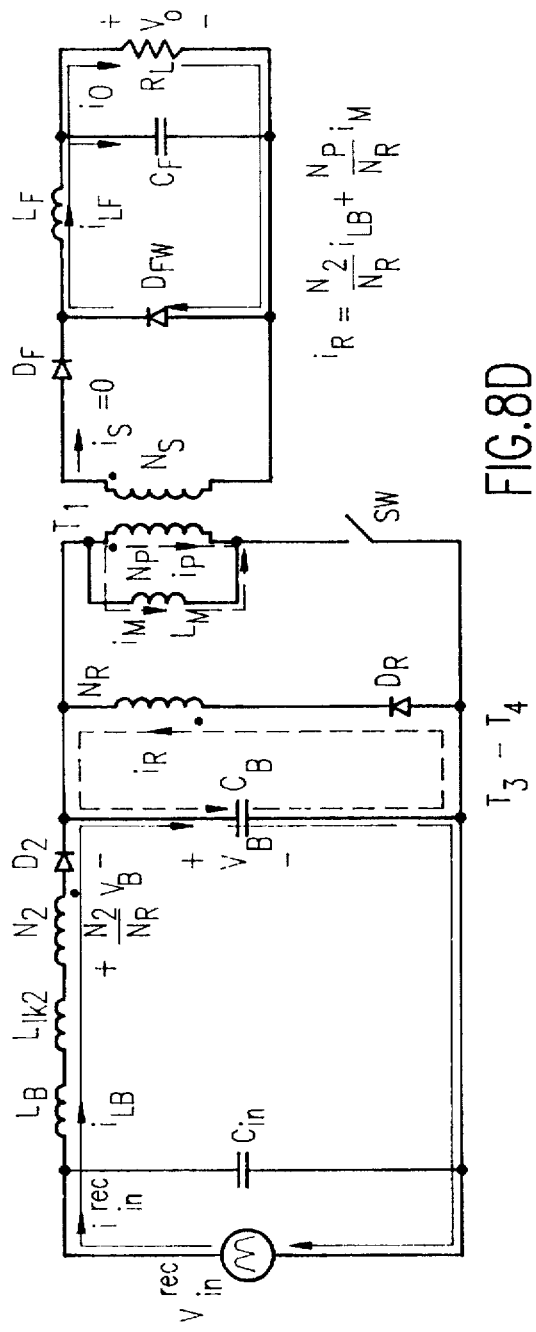
Figure 8E:
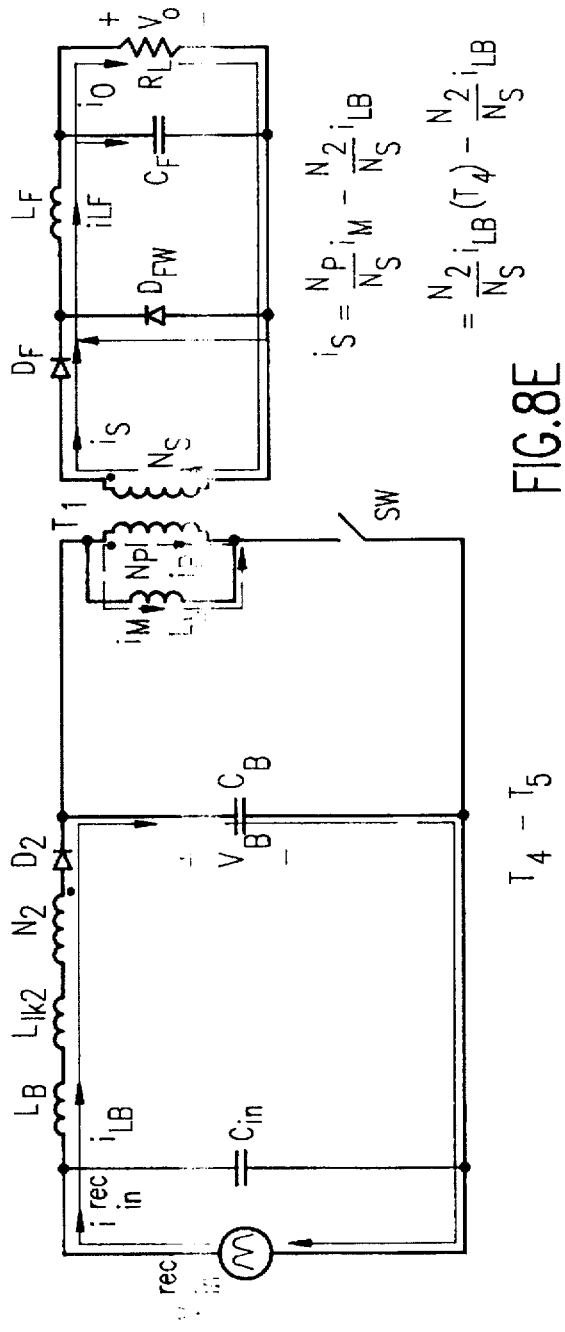

After the commutation period is completed at $t=T_3$, the entire boost-inductor current $i_{LB}$ flows through auxiliary winding $N_2$ into bulk capacitor $C_B$, as shown in FIG. 8(d). As the transformer continues to reset after $t=T_3$, reset current $i_R$ continues to decrease with the slope given by $$\frac{di_R}{dt} = -\left[\frac{N_2}{N_R} \frac{(1 + N_2/N_R)V_B - V_{in}^{rec}}{L_B + L_{lk2}} + \left(\frac{N_P}{N_R}\right)^2 \frac{V_B}{L_M}\right] \quad (34)$$

$$\approx -\left[\frac{N_2}{N_R} \frac{(1 + N_2/N_R)V_B - V_{in}^{rec}}{L_B} + \left(\frac{N_P}{N_R}\right)^2 \frac{V_B}{L_M}\right]$$

which is obtained from Eq.31 by setting $i_1=0$ and $i_2=i_{LB}$, and by using expression for $di_{LB}/dt$ during the $[T_3-T_4]$ interval given in Eq. 36. Since the slope of $i_{LB}$ in Eq. 36 is much smaller than the slope of $i_1$ and $i_2$ in Eq. 29 due to a relative large value of $L_B$, the $di_R/dt$ rate during the $[T_3-T_4]$ interval is much smaller than that during the commutation interval $[T_2-T_3]$, as indicated in FIG. 9(g).

The transformer reset is completed at $t=T_4$, when reset current $i_R$ becomes zero. It should be noted that when $i_R$ reaches zero at $t=T_4$, magnetizing current $i_M$ is negative and equal to $$i_M(t=T_4) = -\frac{N_2}{N_P} i_{LB}(t=T_4), \quad (35)$$

as shown in FIG. 9(e). Expression in Eq.35 was obtained from Eq.31 by setting $i_R(t=T_4)=0$, and recognizing from FIG. 9(c) that $i_1(t=T_4)=0$, $i_2(t=T_4)=i_{LB}(t=T_4)$.

During the $[T_3-T_4]$ interval, the downslopes of boost-inductor current $i_{LB}$ and output-filter-inductor current $i_{LF}$ are constant and given by $$\frac{di_{LB}}{dt} = \quad (36)$$

$$-\frac{\left(1 + \frac{N_2}{N_B}\right) V_B - V_{in}^{rec}}{L_B + L_{lk2}} \approx -\frac{\left(1 + \frac{N_2}{N_B}\right) V_B - V_{in}^{rec}}{L_B},$$

and $$\frac{di_{LF}}{dt} = -\frac{V_O}{L_F} \quad (37)$$

The downslope of magnetizing current $i_M$ during this time interval is given by Eq.30, as shown in FIG. 9(e).

After the reset of the transformer core is completed at $t=T_4$, the voltages across all transformer windings become zero. As a result, the voltage across switch SW becomes equal to the voltage $V_B$ of bulk capacitor $C_B$, as shown in FIG. 9(b). At the same time, a part of magnetizing current $i_M$ which is negative at $t=T_4$ starts flowing through secondary winding $N_S$ and rectifier $D_F$. Since the voltage across the transformer windings is zero, $i_M$ stays constant until the next switching cycle is initiated at $t=T_5$. From FIG. 8(e), applying Ampere's law for the final time, secondary winding current $i_S$ during the $[T_4-T_5]$ interval is given by $$i_S = -\frac{N_P}{N_S} i_M - \frac{N_2}{N_S} i_{LB} = \frac{N_2}{N_S} i_{LB}(t=T_4) - \frac{N_2}{N_S} i_{LB}, \quad (38)$$

Also, during the [T₄–T₅] interval, shown in FIG. 8(e), $i_{LF}$ continues to decrease with the downslope given in Eq.37, while $i_{LB}$ continues to decrease with a smaller downslope given by $$\frac{di_{LB}}{dt} = -\frac{V_B - v_{in}^{rec}}{L_B + L_{lk2}} \approx -\frac{V_B - v_{in}^{rec}}{L_B}, \quad (39)$$

as shown in FIG. 9(c).

From the preceding analysis of the proposed S⁴ICS circuit operating with $L_B$ in CCM, it can be seen that the leakage inductances $L_{lk1}$ and $L_{lk2}$ of auxiliary windings $N_1$ and $N_2$ only play significant roles during the commutation periods [T₀–T₁] and [T₂–T₃]. Namely, assuming negligible leakage inductances, i.e., $L_{lk1}=L_{lk2}=0$ in FIG. 8, the volt-second-product balance of $L_B$ during the on and off times is given by $$\Lambda_{ON} = \left( v_{in}^{rec} - \frac{N_1}{N_P} V_B \right) T_{ON} = \Lambda_{OFF} = \quad (40)$$

$$\left( V_B + \frac{N_2}{N_R} V_B - v_{in}^{rec} \right) T_{rset} + (V_B - v_{in}^{rec})(T_{OFF} - T_{rset})$$

where $\Lambda_{ON}$ and $\Lambda_{OFF}$ are the volt-second products of $L_B$ during the on and off times, respectively, and $T_{rset}$ is the reset time of the transformer core, indicated in FIG. 9(b).

Since, for the fast output-voltage control, the duty cycle of switch SW is constant over a half of a line period (see Eq.15), $T_{ON}$ and $T_{OFF}$ are also constant. Therefore, as rectified-line voltage $v_{in}^{rec}$ increases towards its peak, the volt-second-product during the on time, $\Lambda_{ON}$, increases, while the volt-second-product during the off time, $\Lambda_{OFF}$, decreases. As a result, a volt-second-product (flux) balance of the $L_B$ core cannot be maintained, the resulting large imbalance eventually leads to the saturation of the $L_B$ core. To maintain the required volt-second-product balance, it is necessary to proportionally reduce $\Lambda_{ON}$ and proportionally increase $\Lambda_{OFF}$ as $v_{in}^{rec}$ increases. The desired reduction of $\Lambda_{ON}$ and increase of $\Lambda_{OFF}$ in the proposed circuit in FIG. 4 is brought about by leakage inductances $L_{lk1}$ and $L_{lk2}$. Namely, the volt-second-product balance which takes into account the leakage-inductance effect, is $$(v_{in}^{rec} - V_Y^{ON})\Delta T_{com}^{ON} + \left( v_{in}^{rec} - \frac{N_1}{N_P} V_B \right)(T_{ON} - \Delta T_{com}^{ON}) = \quad (41)$$

$$(V_Y^{OFF} - v_{in}^{rec})\Delta T_{com}^{OFF} + \left( V_B + \frac{N_2}{V_R} V_B - v_{in}^{rec} \right)$$

$$(T_{rset} - \Delta T_{com}^{OFF}) + (V_B - v_{in}^{rec})(T_{OFF} - T_{rset}),$$

where $V_Y^{ON}$ and $V_Y^{OFF}$ are the voltages of node Y in FIG. 8(a) given in Eqs. 21 and 33, respectively, while $\Delta T_{com}^{ON}$ and $\Delta T_{com}^{OFF}$ are the commutation periods [T₀–T₁] and [T₂–T₃] respectively, as indicated in FIG. 9(b).

Eq. 41 can be rewritten as $$\left( v_{in}^{rec} - \frac{N_1}{N_P} V_B \right) T_{ON} - \left( V_Y^{ON} - \frac{N_1}{N_P} V_B \right) \Delta T_{com}^{ON} = \quad (42)$$

$$\left( V_B + \frac{N_2}{N_R} V_B - v_{in}^{rec} \right) T_{rset} +$$

-continued $$(V_B - v_{in}^{rec})(T_{OFF} - T_{rset}) + \left( V_Y^{OFF} - \left( 1 + \frac{N_2}{N_R} \right) V_B \right) \Delta T_{com}^{OFF}.$$

As it can be seen comparing Eqs. 40 and 42, leakage inductances $L_{lk1}$ and $L_{lk2}$ decrease $\Lambda_{ON}$ for $$\Delta \Lambda_{ON} = -\left[ V_Y^{ON} - \frac{N_1}{N_P} V_B \right] \Delta T_{com}^{ON}, \quad (43)$$

and increase $\Lambda_{OFF}$ for $$\Delta \Lambda_{OFF} = -\left[ V_Y^{OFF} - \left( 1 + \frac{N_2}{N_R} \right) V_B \right] \Delta T_{com}^{OFF}, \quad (44)$$

where $\Delta \Lambda_{ON}$ and $\Delta \Lambda_{OFF}$ are the hatched areas in FIG. 9(b).

Because, according to Eqs. 20 and 29, the slopes of currents $i_1$ and $i_2$ are constant, commutation times $\Delta T_{com}^{ON}$ and $\Delta T_{com}^{OFF}$ are proportional to the instantaneous values of $i_{LB}$ at the moment switch SW is closed and open, respectively. As a result, $|\Delta \Lambda_{ON}|$ and $|\Delta \Lambda_{OFF}|$ (hatched areas in FIG. 9(b)) increase as the line voltage increases toward its peak because $i_{LB}$ increases, as illustrated in FIG. 10. Therefore, with properly selected leakage inductances $L_{lk1}$ and $L_{lk2}$, the volt-second-product balance on the $L_B$ core can be maintained during a half of a line period even with a constant duty cycle of switch SW. To obtain the desirable results, the total leakage inductance $L_{lk}=L_{lk1}+L_{lk2}$ should be typically 10% to 20% of the $L_B$ inductance.

Finally, the number of turns of the transformer reset winding $N_R$ is determined by the required volt-second-product balance at maximum duty cycle. Generally, at maximum duty cycle, the volt-second-product balance requires $$V_B T_{ON} = V_R T_{OFF} = \frac{N_P}{N_R} V_B T_{OFF}, \quad (45)$$

where $T_{ON}$ is the switch on-time, $T_{OFF}$ is the off time of the switch, and $V_R$ is the reset voltage. If the maximum duty cycle $D_{max}=50\%$ ($T_{ON}=T_{OFF}$), which occurs at low line and full load, is assumed, then from Eq. 45 follows that $$N_R = N_P \quad (46)$$

because $T_{ON}=T_{OFF}$. As a result, the voltage across switch SW during off time is $$V_{SW} = \left( 1 + \frac{N_P}{N_R} \right) V_B = 2V_B. \quad (47)$$

The maximum stress occurs at high line when $V_B$ is maximum. Therefore, for universal line-voltage-range applications, the required rating of the switch is in the 800- to 900-V range. The circuit proposed in this invention can be used with a lower voltage-rated switch (e.g. 600 V) in universal line-voltage applications if a different transformer resetting technique as, for example, RCD-clamp or active-clamp technique is used.

Figure 11:
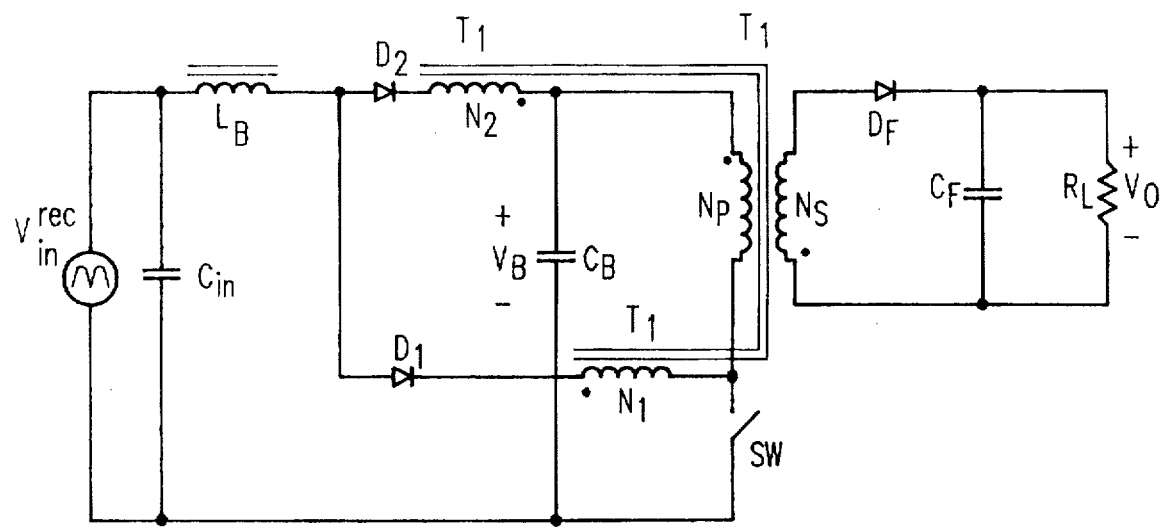
FIG. 11 is a circuit diagram of a flyback implementation of the $S^4ICS$ using the concept described in this invention.

It should be noted that the concept explained in this invention can be extended to any other single- or multiple-switch topology. FIG. 11 shows the implementation with the flyback topology. As can be seen from FIG. 11, this implementation does not require a separate reset winding because the transformer reset is done by the output voltage through the secondary-winding. Also, it should be noted that in the flyback implementation a direct energy transfer from the input to the output occurs during the off time.

To verify the operation and performance of the proposed S⁴ICS technique for both the DCM and CCM operation of $L_B$, a 100-W/5-V, universal line-voltage range (90–265 Vac), forward converter S⁴ICS shows in FIG. 4 was built. The following components were used for the implementation of the circuit with $L_B$ operating in DCM $C_{in}$-1 µF; $D_1$, $D_2$, & $D_R$-BYM26E; $D_F$ & $D_{FW}$-IR40CPQ045; SW-IXTK21N100; $C_B$-330 µF/450 V; $L_F$-1.4 µH; $C_F$-3× 2200 µF, $L_B$-58 µH, and $T_1$-EER35 core with $N_P$=$N_R'$=48 turns, $N_1$=20 turns, $N_2$=26 turns, and $N_S$=4 turns, leakage inductance $L_{1k1}$+$L_{1k2}$≈4.6 µH. For the implementation with $L_B$ operating in CCM, except for boost inductor $L_B$ and transformer $T_1$ windings, all other components were the same as for the DCM operation. In the CCM implementation, $L_B$=240 µH and $T_1$ with $N_P$=$N_R$=48 turns, $N_1$=18 turns, $N_2$=12 turns, and $N_S$=4 turns, and $L_{1k1}$+$Lp_{1k2}$≈50 µH were taken. In both implementations the same, low-cost, current-mode, PWM IC controller (UC3845) was used to implement a fast output-voltage feedback control. The switching frequencies of both implementations were 75 kHz.

Figure 12A:
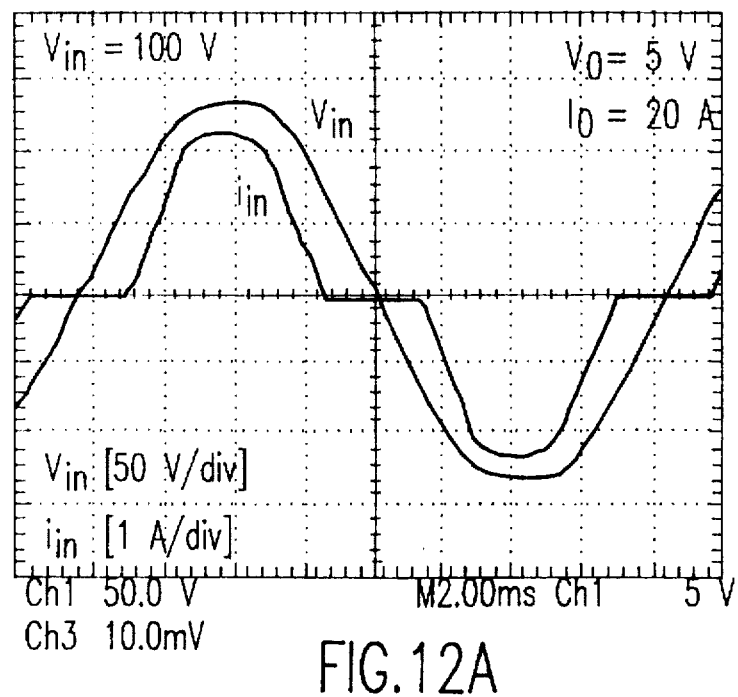
FIG. 12a and b shows oscillograms of line voltage and current of DCM implementation of experimental converter.
Figure 12B:
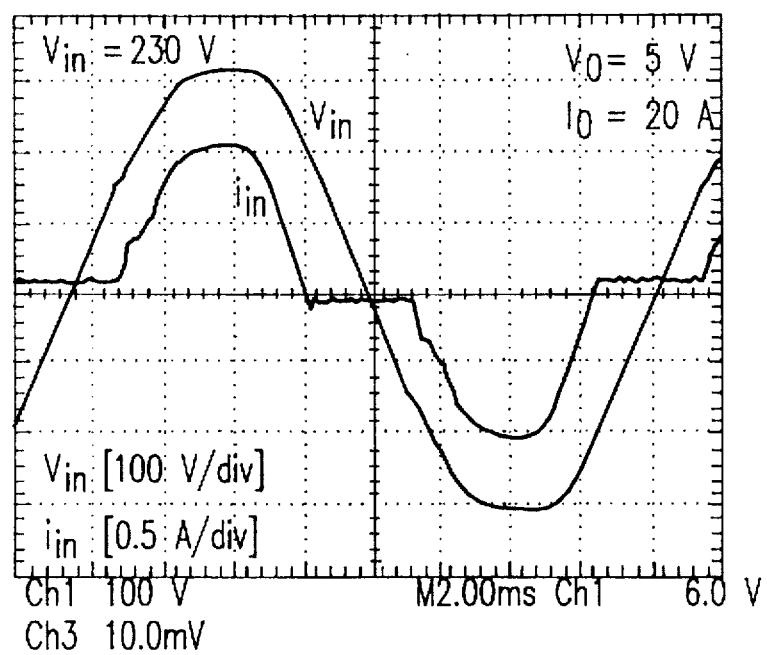
Figure 13A:
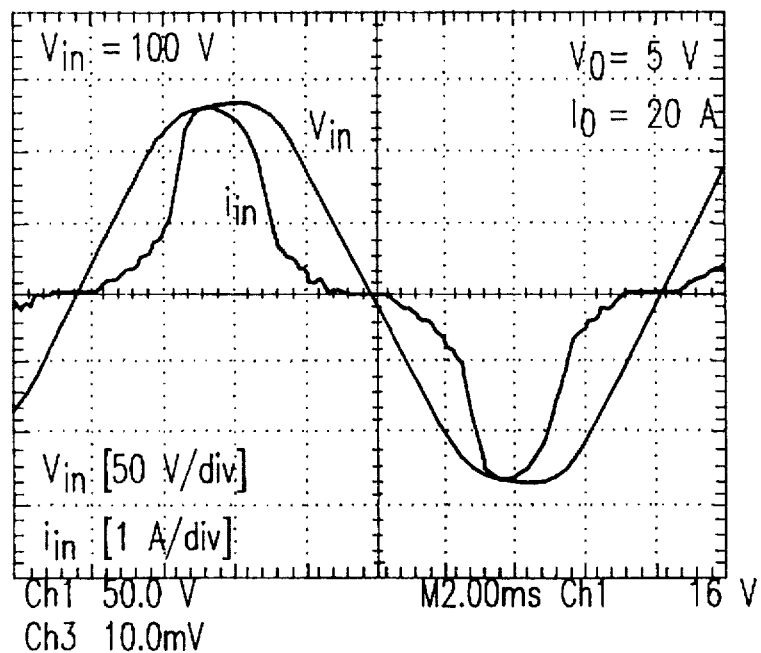
FIG. 13a and b shows oscillograms of line voltage and current of CCM implementation of experimental converter.
Figure 13B:
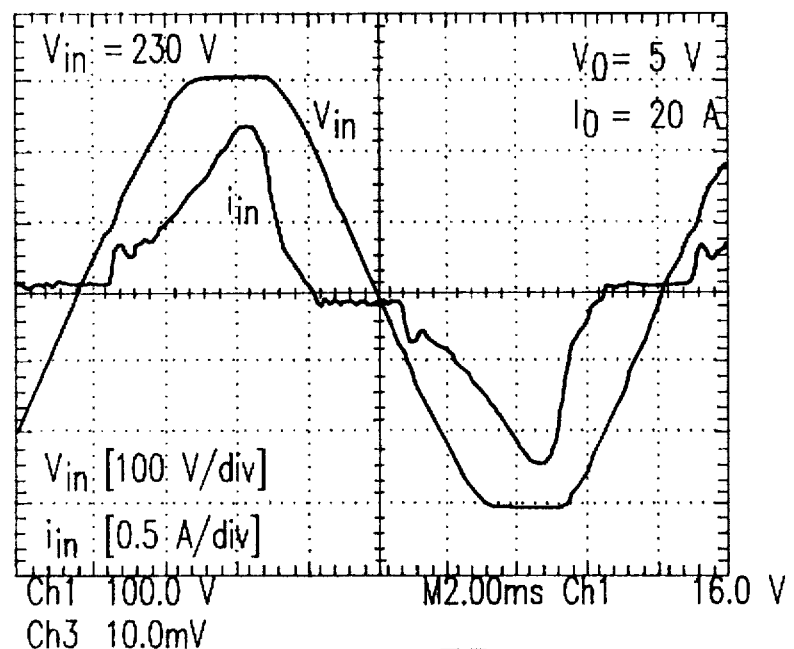

FIGS. 12 and 13 show the typical line voltage and current waveforms of the built converter for the DCM and CCM implementations, respectively. Table 1 summarizes the power-factor, total-harmonic-distortion (THD), bulk-capacitor-voltage ($V_B$), and efficiency measurements for the two implementations. As it can be seen from the oscillograms and Table 1, both implementations work with a high power factor and low THD, while keeping bulk-capacitor voltage $V_B$ below 450 Vdc. However, the efficiency of the CCM implementation is slightly higher. Also, it should be noted that there is a trade-off between the power factor and maximum $V_B$. The DCM implementation can achieve a higher power factor (>0.9), but the maximum $V_B$ is slightly over 400 V. The CCM implementation has a lower power factor (<0.9), but also the maximum voltage on $V_B$ always stays below 400 V.

TABLE 1

Measured Performance Comparisons Between
The DCM and CCM Implementations
($V_o$ = 5 V, $I_o$ = 20 A, fs = 74 kHz)

| | DCM | | | | CCM | | | |
|---|---|---|---|---|---|---|---|---|
| $V_{in}$[V] | PF | THD | $V_B$[V] | η[%] | PF | THD | $V_B$[V] | η[%] |
| 90 | 0.927 | 37.1 | 149 | 74.9 | 0.895 | 43.7 | 145 | 76.0 |
| 100 | 0.927 | 37.2 | 158 | 75.5 | 0.894 | 46.3 | 150 | 77.5 |
| 120 | 0.927 | 37.9 | 191 | 75.9 | 0.889 | 47.9 | 179 | 78.5 |
| 220 | 0.919 | 38.6 | 349 | 74.2 | 0.891 | 45.6 | 318 | 78.2 |
| 230 | 0.919 | 38.7 | 358 | 74.0 | 0.892 | 44.8 | 333 | 78.1 |
| 265 | 0.916 | 37.8 | 409 | 73.4 | 0.889 | 43.0 | 381 | 77.2 |

While the invention has been described in terms of a single preferred embodiment, those skilled in the art will recognize that the invention can be practiced with modification within the spirit and scope of the appended claims.

We claim:

1. A single-stage, single-switch, isolated power-supply with input current shaping and output voltage regulation, comprising in combination:

rectified ac voltage means;

an energy storage inductor connected to said rectified ac means;

an energy storage capacitor;

means coupling said energy storage inductor and energy storage capacitor to provide energy transfer between said capacitor and said inductor;

an isolating transformer having a primary winding and a secondary winding;

means coupling said secondary winding to a load;

switch means for periodically coupling and for periodically decoupling said primary winding to and from said energy storage capacitor;

said isolating transformer having an auxiliary winding coupled to said energy storage inductor; and said auxiliary winding generating a voltage in opposition to said rectified ac voltage means when said switch means periodically couples said primary winding to said energy storage capacitor, thereby reducing the volt-time product across said energy storage inductor when said switch means periodically couples said primary winding to said energy storage capacitor.

2. A single-stage, single-switch, isolated power-supply with input current shaping and output voltage regulation, comprising in combination:

rectified ac voltage means;

an energy storage inductor connected to said rectified ac voltage means;

an energy storage capacitor;

means coupling said energy storage inductor and energy storage capacitor to provide energy transfer between said capacitor and said inductor;

an isolating transformer having a primary winding and a secondary winding;

means coupling said secondary winding to a load;

switch means for periodically coupling and for periodically decoupling said primary winding to and from said energy storage capacitor;

said isolating transformer having a first auxiliary winding coupled to said inductor;

said first auxiliary winding generating a voltage in opposition to said rectified ac voltage when said switch means periodically couples said primary winding to said energy storage capacitor thereby reducing the volt-time product across said inductor when said switch means periodically couples said primary winding to said energy storage capacitor;

said isolation transformer having a second auxiliary winding coupled to said energy storage inductor and energy storage capacitor; and said second auxiliary winding generating a voltage in opposition to said rectified ac voltage when said switch means periodically decouples said primary winding from said energy storage capacitor, thereby reducing the voltage of the energy storage capacitor required for resetting said inductor when said switch means periodically decouples said primary winding from said energy storage capacitor.

3. A single-stage, single-switch, isolated power-supply with input current shaping and output voltage regulation as in claim 1 wherein said auxiliary winding couples energy from said rectified ac voltage means to said load when said switch means periodically couples said primary winding to said energy storage capacitor.

4. A single-stage, single-switch, isolated power-supply with input current shaping and output voltage regulation as in claim 2 wherein said first auxiliary winding couples energy from said rectified ac voltage means to said load when said switch means periodically couples said primary winding to said energy storage capacitor.

5. An isolated power-supply with input current shaping and output voltage regulation, comprising in combination:

rectified ac voltage means;

an energy storage inductor connected to said rectified ac voltage means;

an energy storage capacitor;

means coupling said energy storage inductor and energy storage capacitor to provide energy transfer between said capacitor and said inductor;

an isolating transformer having a primary winding and a secondary winding;

means coupling said secondary winding to a load;

switch means for periodically coupling and for periodically decoupling said primary winding to and from said energy storage capacitor;

said isolating transformer having an auxiliary winding coupled to said energy storage inductor; and said auxiliary winding generating a voltage in opposition to said rectified ac voltage when said switch means periodically couples said primary winding to said energy storage capacitor, thereby reducing the volt-time product across said inductor when said switch means periodically couples said primary winding to said energy storage capacitor.

6. An isolated power-supply with input current shaping and output voltage regulation as in claim 5 wherein said energy storage inductor operates in a continuous conduction mode.

7. An isolated power-supply with input current shaping and output voltage regulation as in claim 5 wherein said energy storage inductor operates in a discontinuous conduction mode.

8. An isolated power-supply with input current shaping and output voltage regulation, comprising in combination:

rectified ac voltage means;

an energy storage inductor connected to said rectified ac voltage means;

an energy storage capacitor;

means coupling said energy storage inductor and energy storage capacitor to provide energy transfer between said capacitor and said inductor;

an isolating transformer having a primary winding and a secondary winding;

means coupling said secondary winding to a load;

switch means for periodically coupling and for periodically decoupling said primary winding to and from said energy storage capacitor;

said isolating transformer having a first auxiliary winding coupled to said inductor;

said first auxiliary winding generating a voltage in opposition to said rectified ac voltage when said switch means periodically couples said primary winding to said energy storage capacitor, thereby reducing the volt-time product across said inductor when said switch means periodically couples said primary winding to said energy storage capacitor;

said isolation transformer having a second auxiliary winding coupled to said energy storage inductor and energy storage capacitor; and said second auxiliary winding generating a voltage in opposition to said rectified ac voltage means when said switch means periodically decouples said primary winding from said energy storage capacitor, thereby reducing the voltage of the said energy storage capacitor required for resetting said inductor when said switch means periodically decouples said primary winding from said energy storage capacitor.

9. An isolated power-supply with input current shaping and output voltage regulation as in claim 8 wherein said energy storage inductor operates in a continuous conduction mode.

10. An isolated power-supply with input current shaping and output voltage regulation as in claim 8 wherein said energy storage inductor operates in a discontinuous conduction mode.

11. An isolated power-supply with input current shaping and output voltage regulation as in claim 5 wherein said auxiliary winding couples energy from said rectified ac voltage means to said load when said switch means periodically couples said primary winding to said energy storage capacitor.

12. An isolated power-supply with input current shaping and output voltage regulation as in claim 8 wherein said first auxiliary winding couples energy from said rectified ac voltage means to said load when said switch means periodically couples said primary winding to said energy storage capacitor.

13. A single-stage, single-switch, isolated power-supply with input current shaping and output voltage regulation as in claim 1 wherein said energy storage inductor operates in a continuous conduction mode.

14. A single-stage, single-switch, isolated power-supply with input current shaping and output voltage regulation as in claim 1 wherein said energy storage inductor operates in a discontinuous conduction mode.

15. A single-stage, single-switch, isolated power-supply with input current shaping and output voltage regulation as in claim 2 wherein said energy storage inductor operates in a continuous conduction mode.

16. A single-stage, single-switch, isolated power-supply with input current shaping and output voltage regulation as in claim 2 wherein said energy storage inductor operates in a discontinuous conduction mode.

* * * * *